United States Patent
Zhang et al.

(10) Patent No.: US 12,226,771 B2
(45) Date of Patent: Feb. 18, 2025

(54) DRIVING CIRCUIT, DRIVING METHOD AND MICROFLUIDIC SUBSTRATE

(71) Applicant: Shanghai Tianma Micro-Electronics Co., Ltd., Shanghai (CN)

(72) Inventors: Kaidi Zhang, Shanghai (CN); Baiquan Lin, Shanghai (CN); Wei Li, Shanghai (CN); Yunfei Bai, Shanghai (CN); Kerui Xi, Shanghai (CN); Feng Qin, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 765 days.

(21) Appl. No.: 17/455,148

(22) Filed: Nov. 16, 2021

(65) Prior Publication Data

US 2023/0063019 A1    Mar. 2, 2023

(30) Foreign Application Priority Data

Aug. 31, 2021 (CN) .......................... 202111008620.6

(51) Int. Cl.
| | | |
|---|---|---|
| *B01L 3/00* | (2006.01) | |
| *G02B 26/00* | (2006.01) | |
| *G09G 3/34* | (2006.01) | |

(52) U.S. Cl.
CPC ..... *B01L 3/50273* (2013.01); *B01L 3/502792* (2013.01); *G02B 26/005* (2013.01); *G09G 3/348* (2013.01); *B01L 2300/0819* (2013.01); *B01L 2400/0427* (2013.01)

(58) Field of Classification Search
CPC ........... B01L 3/50273; B01L 3/502792; B01L 2300/0819; G01L 2400/0427; G02B 26/005; G09G 3/348; G09G 2330/00; G09G 2300/0852; G09G 2310/0208; G09G 2310/061; G09G 2320/0204; G09G 2380/08

See application file for complete search history.

(56) References Cited

U.S. PATENT DOCUMENTS

| | | | | |
|---|---|---|---|---|
| 2019/0111433 A1* | 4/2019 | French | ............... | B01L 3/502792 |
| 2020/0175931 A1* | 6/2020 | Beard | ................... | G09G 3/348 |
| 2020/0319449 A1* | 10/2020 | Lin | ........................ | G02B 26/10 |

FOREIGN PATENT DOCUMENTS

| | | |
|---|---|---|
| CN | 109894169 A | 6/2019 |
| CN | 110687953 A | 1/2020 |

* cited by examiner

*Primary Examiner* — Mihir K Rayan
(74) *Attorney, Agent, or Firm* — Anova Law Group, PLLC

(57) ABSTRACT

A driving circuit, a driving method and a microfluidic substrate are provided. The driving circuit includes a first switching unit, a second switching unit, a reset unit, a first capacitor, and a second capacitor. In a first stage of a driving process of the driving circuit, the first switching unit is turned on, a first voltage signal is transmitted to a first node, the second switching unit is turned on, a second voltage signal is input to an output terminal of the driving circuit, and the driving circuit outputs an AC signal. In a second stage of the driving process, the first switching unit is turned off, the valid signal output by the second scan signal terminal controls the reset unit to be turned on, a third voltage signal is input to the output terminal of the driving circuit for reset, and the driving circuit outputs a DC signal.

20 Claims, 17 Drawing Sheets

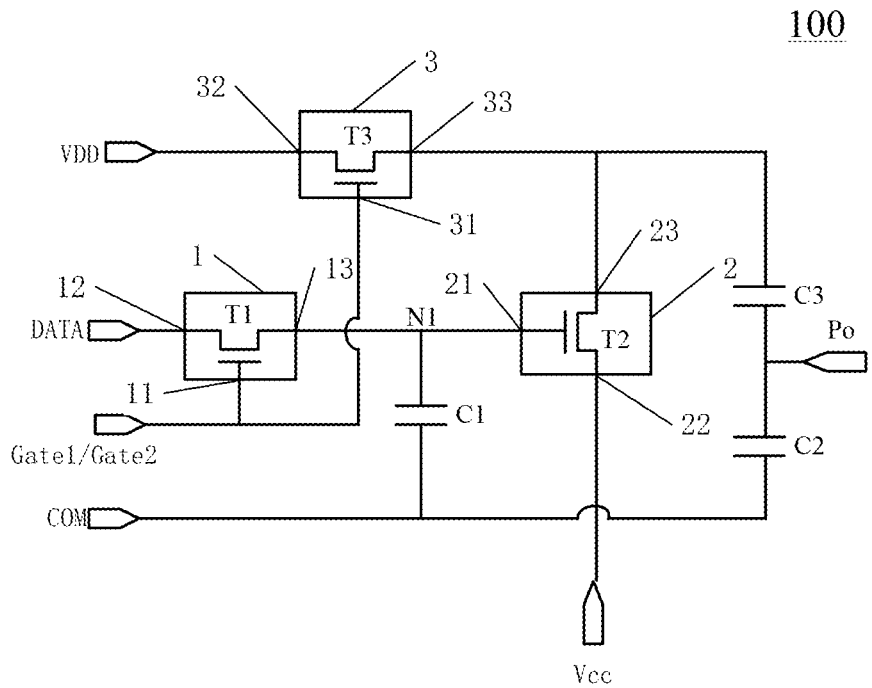

FIG. 10

| In a first stage, controlling the first switch unit to be turned on by a valid signal output by the first scan signal terminal, transmitting a first voltage signal of the first voltage signal terminal to the first node, charging the first capacitor, and turning on the control terminal of the second switch unit in response to a potential of the first node, inputting a second voltage signal to the output terminal of the driving circuit, and outputting an AC signal by the output terminal of the driving circuit |
|---|

↓

| In a second stage, controlling the first switch unit to be turned off by a signal output from the first scan signal terminal, at the same time, controlling the reset unit to be turned on by a valid signal output from the second scan signal terminal, inputting a third voltage signal of the third voltage signal terminal to the output terminal of the driving circuit, resetting the output terminal of the driving circuit, and outputting a DC signal by the output terminal of the driving circuit |
|---|

FIG. 11

DRIVING CIRCUIT, DRIVING METHOD AND MICROFLUIDIC SUBSTRATE

CROSS-REFERENCE TO RELATED APPLICATION

This application claims the priority of Chinese Patent Application No. 202111008620.6, filed on Aug. 31, 2021, the content of which is incorporated by reference in its entirety.

TECHNICAL FIELD

The present disclosure generally relates to the field of microfluidic technology and, more particularly, relates to a driving circuit, a driving method and a microfluidic substrate.

BACKGROUND

Microfluidics technology refers to a technology that uses microfluidic channels (e.g., with a size of tens to hundreds of microns) to process tiny amount of fluids (e.g., having a volume from nanoliters to angstrom liters). Microfluidic technology can be applied to the field of, for example, biological genetic engineering, disease diagnosis and drug research, cell analysis, environmental monitoring and protection, health quarantine, or judicial identification.

In the field of digital microfluidic technology based on electrowetting-on-dielectric (EWOD), in a microfluidic substrate, a control circuit is often used to provide a voltage to the driving electrodes to form an electric field between adjacent driving electrodes, and the droplets are moved under the driving of the electric field.

At present, in the field of microfluidics, passive driving schemes and active driving schemes are adopted as the driving methods. In a passive driving scheme, the driving electrode is directly connected to the signal, and it can be driven by an AC signal or a DC signal. For a passive driving scheme, if a DC signal is used for driving, the dielectric layer will be charged and accumulated, which is likely to cause a droplet hysteresis and the driving ability for biochemical reagents is weak. Accordingly, the performance and the application of the chip is affected. If the AC signal is used for the passive driving, the number of signals required is large, for example, more signal lines are needed to transmit signals. Thus, the difficulty and cost of the fabrication process will be increased.

Thus, there is an increasing tendency to develop towards the active driving scheme. In the general active driving scheme of 1T1C, the signal on the driving electrodes relies on the storage capacitor to maintain, and it is impossible to achieve an AC output within one frame. Even positive and negative voltages are provided in different frames to provide a similar AC effect, the frequency is limited by the frame frequency, which cannot meet the needs of digital microfluidics (usually 0.1-100 kHz, preferably 1-10 kHz).

Therefore, there is an urgent need to provide a driving circuit, a driving method, and a microfluidic substrate capable of realizing an AC output in the active driving. The disclosed driving circuits, driving methods and microfluidic substrates are directed to solve one or more problems set forth above and other problems in the arts.

SUMMARY

One aspect of the present disclosure provides a driving circuit. The driving circuit may include a first switching unit. A control terminal of the first switching unit is electrically connected to a first scan signal terminal, a first terminal of the first switching unit is electrically connected to a first voltage signal terminal, and a second terminal of the first switching unit is electrically connected to a first node. The driving circuit may also include a second switching unit. A control terminal of the second switching unit is electrically connected to the first node, a first terminal of the second switching unit is electrically connected to a second voltage signal terminal, a second voltage signal input into the second voltage signal terminal is an AC signal, and a second terminal of the second switching unit is electrically connected to an output terminal of the driving circuit. Further, the driving circuit may include a reset unit. A control terminal of the reset unit is electrically connected with the second scan signal terminal, a first terminal of the reset unit is electrically connected with a third voltage signal terminal, and a second terminal of the reset unit is electrically connected with the output terminal of the driving circuit. Further, the driving circuit may include a first capacitor, wherein a first plate of the first capacitor is electrically connected to the first node, and a second plate of the first capacitor is electrically connected to a common voltage supply terminal. Further, the driving circuit may include a second capacitor. A first plate of the second capacitor is electrically connected with the output terminal of the driving circuit, and a second plate of the second capacitor is electrically connected with the common voltage supply terminal.

Another aspect of the present disclosure provides a driving method of a driving circuit. The driving method may include the above-mentioned driving circuit. The driving circuit may include a first switching unit. A control terminal of the first switching unit is electrically connected to a first scan signal terminal, a first terminal of the first switching unit is electrically connected to a first voltage signal terminal, and a second terminal of the first switching unit is electrically connected to a first node. The driving circuit may also include a second switching unit. A control terminal of the second switching unit is electrically connected to the first node, a first terminal of the second switching unit is electrically connected to a second voltage signal terminal, a second voltage signal input into the second voltage signal terminal is an AC signal, and a second terminal of the second switching unit is electrically connected to an output terminal of the driving circuit. Further, the driving circuit may include a reset unit. A control terminal of the reset unit is electrically connected with the second scan signal terminal, a first terminal of the reset unit is electrically connected with a third voltage signal terminal, and a second terminal of the reset unit is electrically connected with the output terminal of the driving circuit. Further, the driving circuit may include a first capacitor, wherein a first plate of the first capacitor is electrically connected to the first node, and a second plate of the first capacitor is electrically connected to a common voltage supply terminal. Further, the driving circuit may include a second capacitor. A first plate of the second capacitor is electrically connected with the output terminal of the driving circuit, and a second plate of the second capacitor is electrically connected with the common voltage supply terminal. The driving method may also include, in a first stage, controlling the first switching unit to be turned on by the valid signal output by the first scan signal terminal, transmitting the first voltage signal at the first voltage signal terminal to the first node, charging the first capacitor, and turning on the control terminal of the second switching unit in response to a potential of the first node, inputting a second voltage signal to the output terminal of the driving circuit, and outputting an AC signal by the output terminal of the driving circuit. Further, the driving method may include, in a second stage, controlling the first switching unit to be turn off by a signal output from the first scan signal terminal, at the same time, controlling the reset unit to be turned on by the valid signal output from the second scan signal terminal, inputting a third voltage signal of the third voltage signal terminal to the output terminal of the driving circuit, resetting the output terminal of the driving circuit, and outputting a DC signal by the output terminal of the driving circuit.

Another aspect of the present disclosure includes providing a microfluidic substrate. The microfluidic substrate may include a first substrate and a second substrate that are opposed to each other. The first substrate may include a first base substrate and an array layer located on a side of the first base substrate adjacent to the second substrate; the array layer may include a plurality of driving circuit. Each driving circuit may include a first switching unit. A control terminal of the first switching unit is electrically connected to a first scan signal terminal, a first terminal of the first switching unit is electrically connected to a first voltage signal terminal, and a second terminal of the first switching unit is electrically connected to a first node. The driving circuit may also include a second switching unit. A control terminal of the second switching unit is electrically connected to the first node, a first terminal of the second switching unit is electrically connected to a second voltage signal terminal, a second voltage signal input into the second voltage signal terminal is an AC signal, and a second terminal of the second switching unit is electrically connected to an output terminal of the driving circuit. Further, the driving circuit may include a reset unit. A control terminal of the reset unit is electrically connected with the second scan signal terminal, a first terminal of the reset unit is electrically connected with a third voltage signal terminal, and a second terminal of the reset unit is electrically connected with the output terminal of the driving circuit. Further, the driving circuit may include a first capacitor, wherein a first plate of the first capacitor is electrically connected to the first node, and a second plate of the first capacitor is electrically connected to a common voltage supply terminal. Further, the driving circuit may include a second capacitor. A first plate of the second capacitor is electrically connected with the output terminal of the driving circuit, and a second plate of the second capacitor is electrically connected with the common voltage supply terminal.

Other aspects of the present disclosure can be understood by those skilled in the art in light of the description, the claims, and the drawings of the present disclosure.

BRIEF DESCRIPTION OF THE DRAWINGS

The drawings incorporated in the specification and constituting a part of the specification illustrate the embodiments of the present disclosure, and together with the description are used to explain the principle of the present disclosure.

FIG. 10 illustrates another exemplary driving circuit according to various disclosed embodiments of the present disclosure;

FIG. 11 illustrates a flow chart of an exemplary driving method according to various disclosed embodiments of the present disclosure;

DETAILED DESCRIPTION

Figure 1:
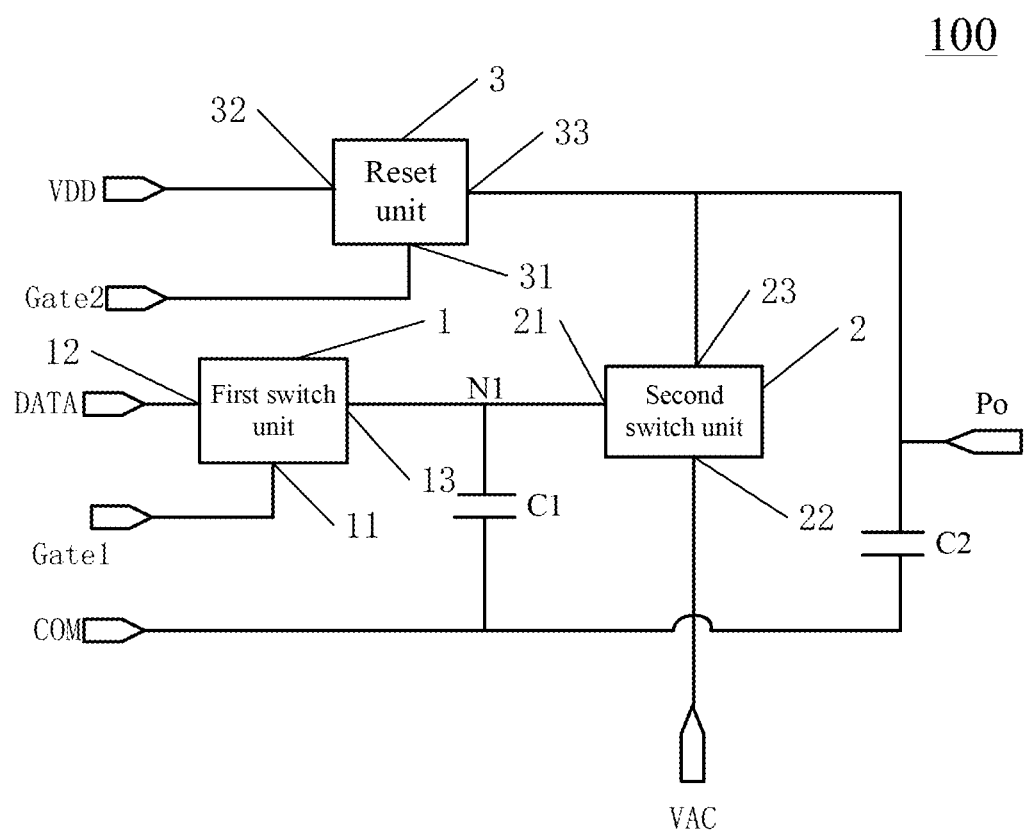
FIG. 1 illustrates an exemplary driving circuit according to various disclosed embodiments of the present disclosure.

Various exemplary embodiments of the present disclosure will now be described in detail with reference to the accompanying drawings. It should be noted that unless specifically stated otherwise, the relative arrangement of components and steps, numerical expressions and numerical values set forth in these embodiments do not limit the scope of the present disclosure.

The following description of at least one exemplary embodiment is actually only illustrative, and in no way serves as any limitation to the present disclosure and its application or use.

The technologies, methods, and equipment known to those of ordinary skill in the relevant fields may not be discussed in detail, but where appropriate, the technologies, methods, and equipment should be regarded as part of the specification.

In all the examples shown and discussed herein, any specific value should be interpreted as merely exemplary, rather than as a limitation. Therefore, other examples of the exemplary embodiment may have different values.

It should be noted that similar reference numerals and letters indicate similar items in the following drawings, and therefore, once an item is defined in one drawing, it does not need to be further discussed in the subsequent drawings.

Figure 2:
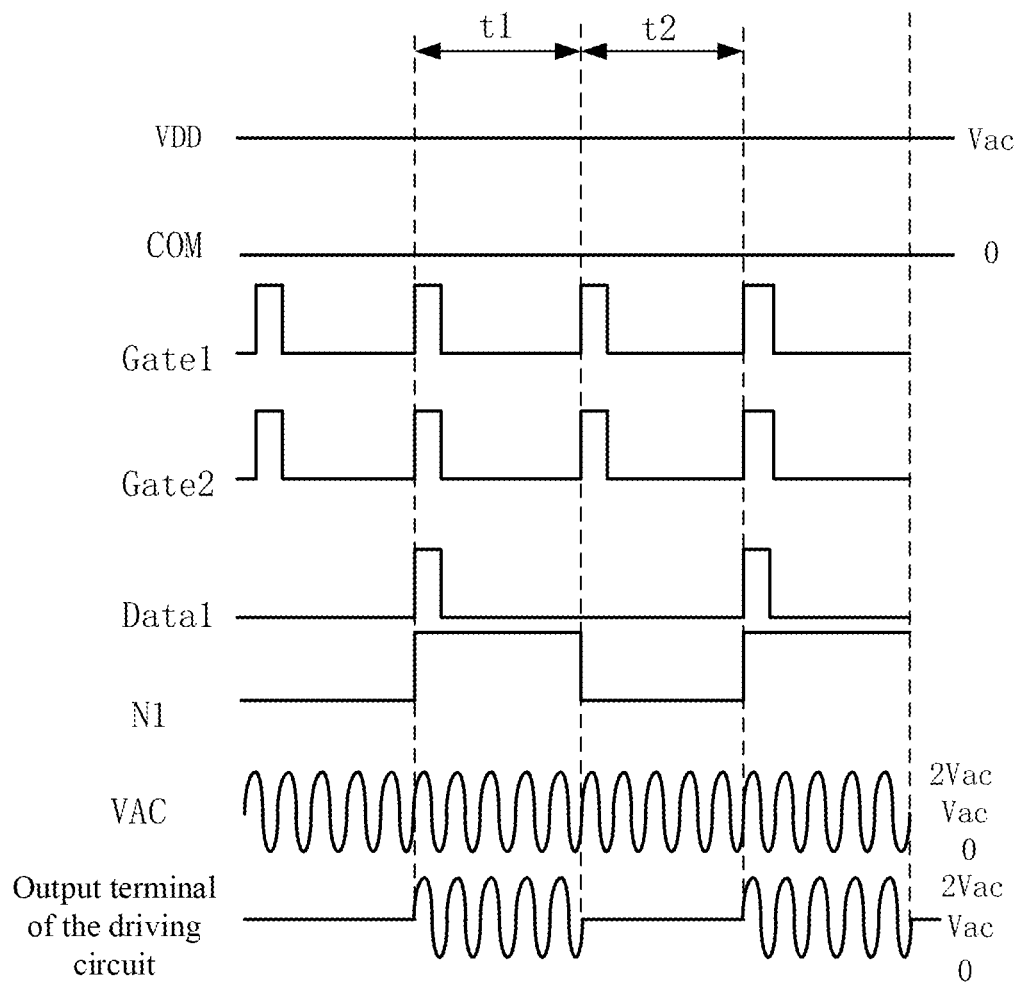
FIG. 2 illustrates an exemplary time sequence of the driving circuit in FIG. 1.

FIG. 1 is a schematic structural diagram of an exemplary driving circuit according to various disclosed embodiments of the present disclosure, and FIG. 2 is a time sequence diagram of the driving circuit in FIG. 1. As shown in FIG. 1, the driving circuit 100 may include a first switching unit 1, a second switching unit 2, a reset unit 3, a first capacitor C1 and a second capacitor C2. The driving circuit 100 may further include a first scan signal terminal Gate1, a first voltage signal terminal DATA, a second voltage signal terminal VAC, a second scan signal terminal Gate2, a third voltage signal terminal VDD, and an output terminal Po of the driving circuit.

The control terminal 11 of the first switching unit 1 may be electrically connected to the first scan signal terminal Gate1, the first terminal 12 of the first switching unit 1 may be electrically connected to the first voltage signal terminal DATA, and the second terminal of the first switching unit 1 13 may be electrically connected to the first node N1. The control terminal 21 of the second switching unit 2 may be electrically connected to the first node N1, and the first terminal 22 of the second switching unit 2 may be electrically connected to the second voltage signal terminal VAC. The second voltage signal input from the second voltage signal terminal VAC may be an AC signal, and the second terminal 23 of the second switching unit 2 may be electrically connected to the output terminal Po of the driving circuit. The control terminal 31 of the reset unit 3 may be electrically connected to the second scan signal terminal Gate2. The first terminal 32 of the reset unit 3 may be electrically connected to the third voltage signal terminal VDD, the second terminal 33 of the reset unit 3 may be electrically connected to the output terminal Po of the driving circuit. The first plate of the first capacitor C1 may be electrically connected to the first node N1, and the second plate of the first capacitor C1 may be electrically connected to the common voltage supply terminal COM. The first plate of the second capacitor C2 may be electrically connected to the output terminal Po of the driving circuit, and the second plate of the capacitor C2 may be electrically connected to the common voltage supply terminal COM.

Referring to FIG. 2, in the first stage t1, the first switching unit 1 may transmit the first voltage signal of the first voltage signal terminal DATA to the first node N1 under the control of the valid signal of the first scan signal terminal Gate1, the control terminal 21 of the second switching unit 2 may be turned on for a conduction in response to the potential of the first node N1, and the second voltage signal input from the second voltage signal terminal VAC may be input to the output terminal Po of the driving circuit. The input second voltage signal may be an AC signal; thus the output terminal Po of the driving circuit may output an AC signal. When the first voltage signal at the first voltage signal terminal DATA is transmitted to the first node N1, the first capacitor C1 may be charged, and the charges stored in the first capacitor C1 may maintain the AC signal output from the output terminal Po of the driving circuit for one frame. In the second stage t2, under the control of the valid signal of the second scan signal terminal Gate2, the reset unit 3 may input the third voltage signal of the third voltage signal terminal VDD to the output terminal Po of the driving circuit to reset the output terminal Po of the driving circuit. The third voltage signal may be a DC signal. At this time, the second capacitor C2 may be charged. When the output terminal Po of the driving circuit is reset, the second switching unit 2 may be disconnected, and the output terminal Po of the driving circuit may be reset to a DC signal. The charges stored in the second capacitor C2 may maintain the output terminal Po of the driving circuit.

In some embodiments, the second scan signal terminal Gate2 may be the first scan signal terminal Gate1 of the driving circuit of the next stage, and the signal of the driving circuit of the previous stage may be reset by the scan signal of the driving circuit of the next stage. In other embodiments, the third voltage signal input from the third voltage signal terminal VDD may be at a constant potential. The third voltage signal may at a DC level, and the voltage value of the third voltage signal may be approximately equal to the median level of the first voltage signal.

Further, the form and frequency of the second voltage signal (DC, AC, sawtooth, pulse, etc.) in this embodiment are not limited, but it may be necessary to ensure that the second switching unit 2 may be turned on when responding to the voltage of the first node N1; and the voltage of the first terminal may be required to be greater than the voltage of the control terminal. Thus, the amplitude of the second voltage signal may be required to be lower than the amplitude of the first voltage signal. If the driving circuit 100 is applied to the microfluidic technology, the frequency of the first voltage signal may be in a range of approximately 0.1 Hz-100 kHZ; and such a range may facilitate the driving of the droplet.

For example, if the amplitude of the second voltage signal is an AC signal of 0-2Vac and the third voltage signal is a DC level signal of Vac, the output terminal Po of the driving circuit may output an AC signal of 0-2Vac and a DC signal of Vac.

Further, the driving circuit 100 of this embodiment may adapt to various forms and frequencies of the second voltage signal. The driving circuit of the general 1T1C structure may be able to adjust the voltage during the holding time (one frame). In this embodiment, the driving circuit 100 may output a signal synchronized with the second voltage signal.

The driving circuit 100 of the present disclosure may realize an AC driving. For example, the signal output by the output terminal Po of the driving circuit may be switched between an AC signal and a DC bias voltage. The first switching unit 1 and the first capacitor C1 may keep the second switching unit 2 at an on state or an off state within one frame. In the first stage t1, the first switching unit 1 may transmit the first voltage signal of the first voltage signal terminal DATA to the first node N1 under the control of the valid signal of the first scan signal terminal Gate1. When the second switching unit 2 is turned on for a conduction, the output terminal Po of the driving circuit may directly output an AC signal. In the second stage t2, the second switching unit 2 may be turned off for a disconnection, and the reset unit 3 may be controlled by the valid signal at the second scan signal terminal Gate2 to input the third voltage signal of the third voltage signal terminal VDD to the output terminal Po of the driving circuit, and the third voltage signal may be maintained by the second capacitor C2 to realize the driving of positive and negative AC signals with a relative DC bias.

Further, in the prior art, the DC driving is usually adopted, and the DC driving is likely to cause a charge accumulation, and the resistance of the position where the charges are accumulated becomes larger. When applied to the microfluidic technology, it is easy to cause droplets to stay at the position. In the present disclosure, because the active AC signal driving may be realized, on the one hand, the number of signal lines may be reduced, and it may also reduce the increase in resistance caused by the accumulation of electric charges during the DC driving. Accordingly, the driving ability may be improved.

Figure 3:
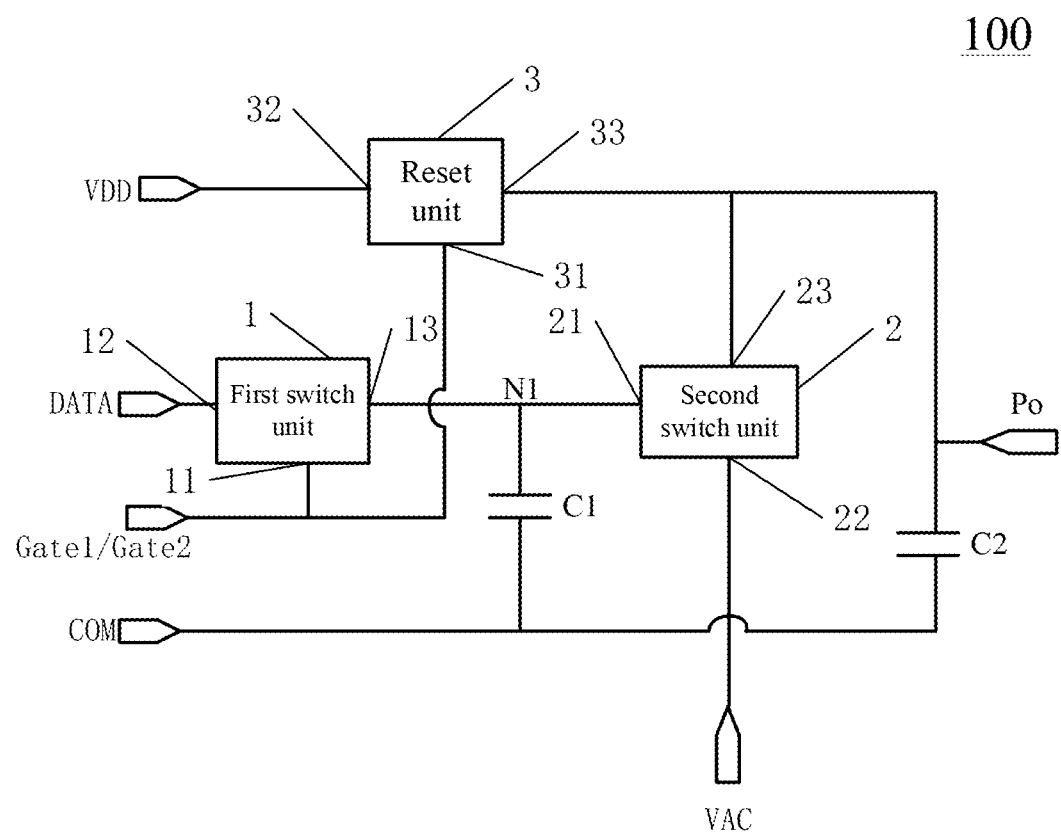
FIG. 3 illustrates another exemplary driving circuit according to various disclosed embodiments of the present disclosure.
Figure 4:
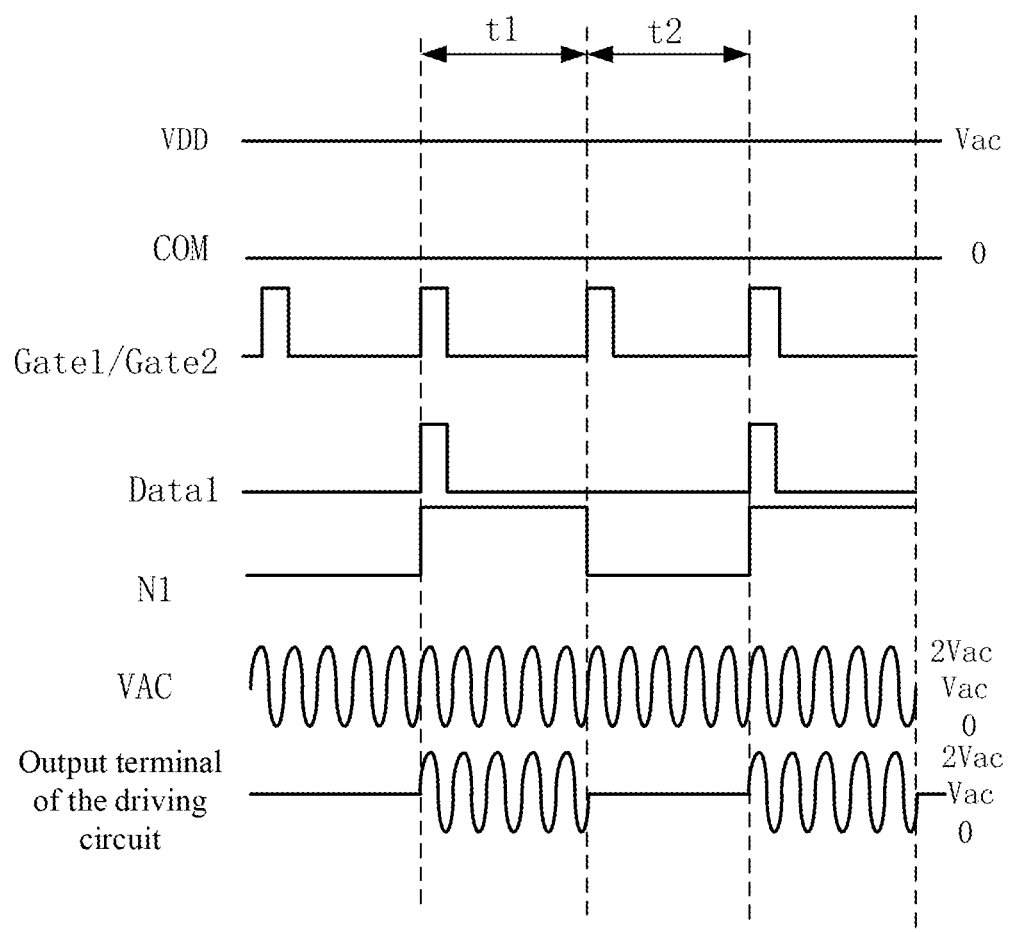
FIG. 4 illustrates an exemplary time sequence of the driving circuit in FIG. 3.

FIG. 3 is a schematic structural diagram of another exemplary driving circuit according to various disclosed embodiments of the present disclosure, and FIG. 4 is a sequence diagram of the driving circuit in FIG. 3. As shown in FIGS. 3-4, in some embodiments, the first scan signal terminal Gate1 may be multiplexed as the second scan signal terminal Gate2.

In such embodiments, the control terminal 31 of the reset unit 3 and the control terminal 11 of the first switching unit 1 may both be connected to the first scan signal terminal Gate1. On the one hand, the metal wiring of the driving circuit 100 may be saved, for example, it may only need to set the first scan to provide scan signals for the reset unit 3 and the first switching unit 1 at the same time. On the other hand, in the second stage t2, although the first switching unit 1 may be turned on under the valid signal of the first scan signal terminal Gate1, at the same time, the reset unit 3 may also be turned on under the valid signal of the first scan signal terminal Gate1. However, because the valid signal of the first scan signal terminal Gate1 may be input for a short time, and the voltage of the first node N1 may be maintained through the first capacitor C1, when the invalid signal of the first scan signal terminal Gate1 is input, the reset unit 3 and the first switching unit 1 may be turned off for a disconnection, and the output terminal Po of the driving circuit will not be affected in the first stage. When the reset is required, the first scan signal terminal Gate1 may control the first switching unit 1 to be turned on again, both the reset unit 3 and the first switching unit 1 may be turned on, but the first voltage signal of the first voltage signal terminal DATA may not be a valid signal; and the second switching unit 2 may not be turned on.

The driving circuit 100 of this embodiment may ensure that the output terminal Po of the driving circuit may be switched between an AC signal and a DC signal, while saving the number of signal lines of the driving circuit 100. Thus, the fabrication process may be simplified, and the production cost may be reduced.

Figure 5:
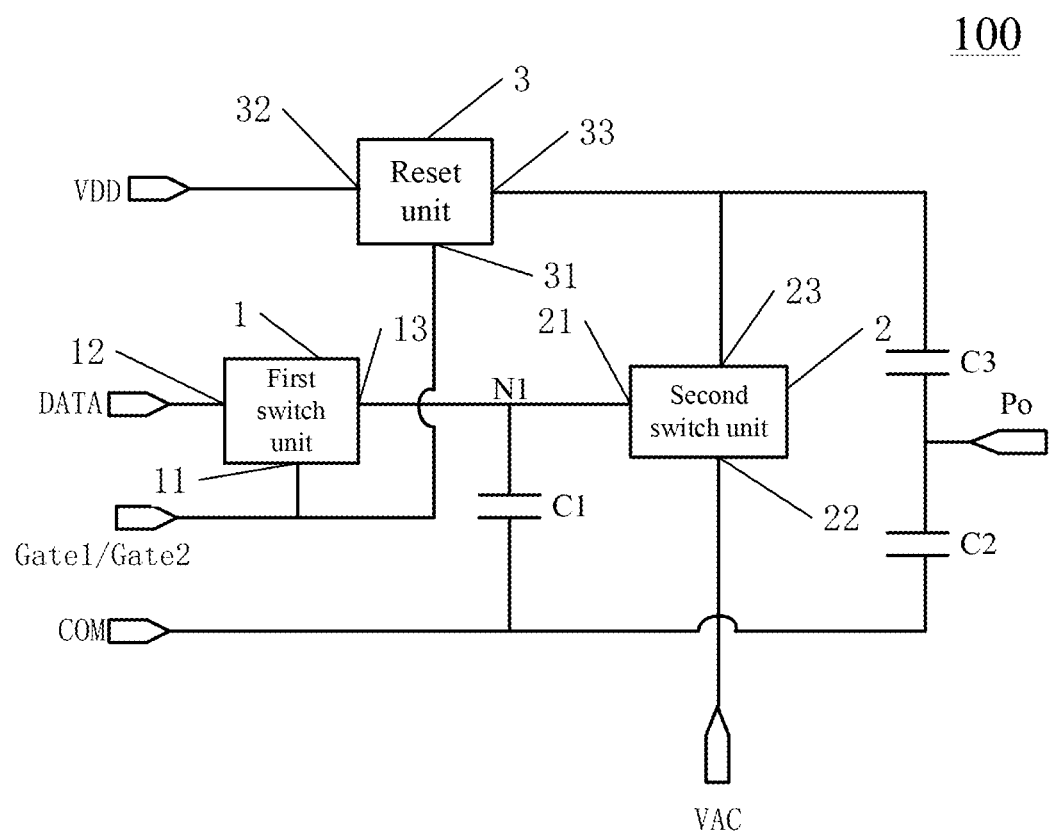
FIG. 5 illustrates another exemplary driving circuit according to various disclosed embodiments of the present disclosure.
Figure 6:
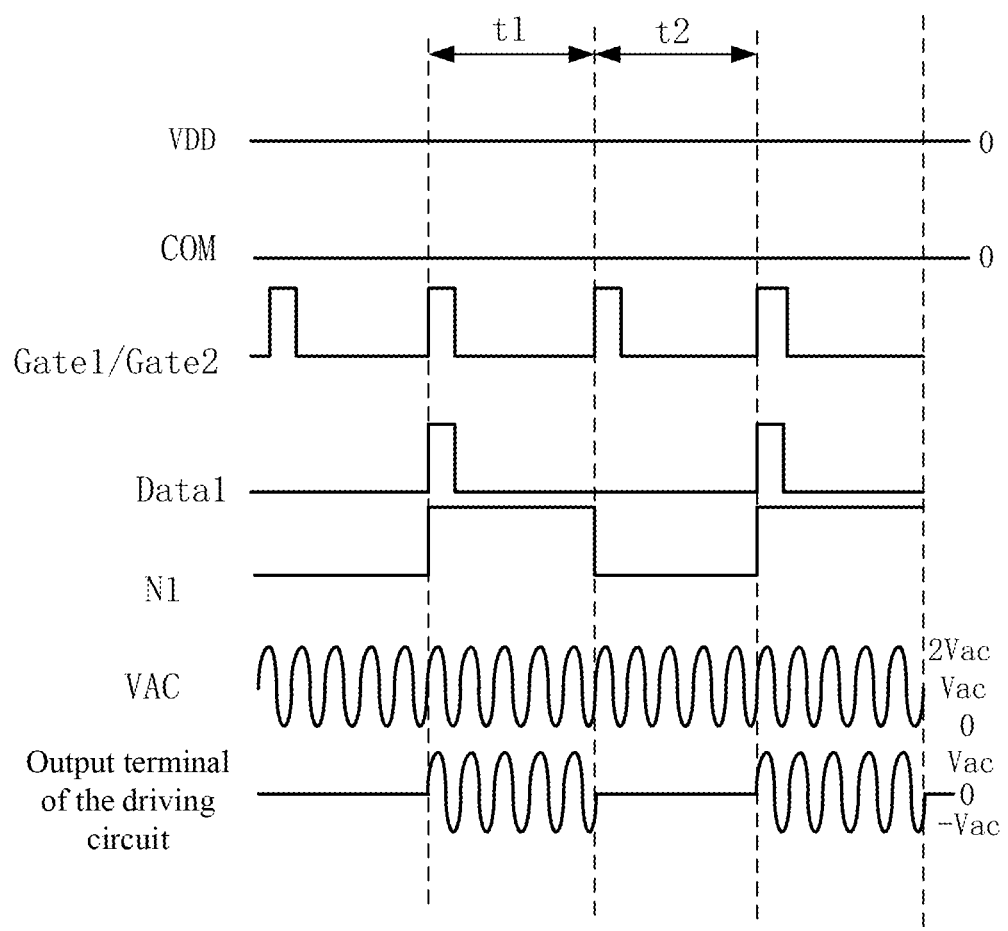
FIG. 6 illustrates an exemplary time sequence of the driving circuit in FIG. 5.

FIG. 5 is a schematic structural diagram of another exemplary driving circuit consistent with various disclosed embodiments of the present disclosure, and FIG. 6 is a sequence diagram of the driving circuit in FIG. 5. As shown in FIGS. 5-6, in some embodiments, the driving circuit 100 in FIG. 5 may further include a third capacitor C3. The first plate (not shown in the figure) of the third capacitor C3 may be electrically connected to the second terminal 23 of the second switching unit 2, and the second plate (not shown in the figure) of the third capacitor C3 may be electrically connected to the output terminal Po of the driving circuit.

It should be noted that, in the embodiment in FIG. 5, the configuration that the first scan signal terminal Gate1 may be multiplexed as the second scan signal terminal Gate2 is used as an example. In other embodiments, the first scan signal terminal Gate1 may not be multiplexed as the second terminal Gate2.

It is understandable that the third capacitor C3 here may play the role of connecting AC and blocking DC. In the first stage t1, the input time of the first scan signal of the first scan signal terminal Gate1 may be relatively short, and the reset unit 3 may be at the off state when the first scan signal is not input. Thus, the third voltage signal may not affect the output of the output terminal Po of the driving circuit.

In one embodiment, the first plate of the third capacitor C3 may be electrically connected to the second terminal 23 of the second switching unit 2, and the second plate of the third capacitor C3 may be electrically connected to the output terminal Po of the driving circuit. The third capacitor C3 may block the DC component in the AC signal of the second voltage signal. For example, when the second voltage signal is an AC signal with an amplitude of 0-2Vac, it may be regarded as the superposition of the DC signal of Vac and the AC signal of ±Vac, and the capacitance impedance may be equivalent to $1/(2\pi fC)$. f is the frequency of the signal. Thus, the DC component may be cut off. The greater the frequency or the capacitance of the AC component, the easier the signal may pass. Therefore, after the AC signal with an amplitude of 0-2Vac passes through the third capacitor C3, the output terminal Po of the driving circuit may output an AC signal of Vac.

In such an embodiment, by providing the third capacitor C3 between the second terminal 23 of the second switching unit 2 and the output terminal Po of the driving circuit, the DC component in the second voltage signal may be filtered and the signal output to the output terminal Po of the driving circuit may be an AC signal; and the driving capability may be improved.

In some embodiments, referring to FIG. 5, the capacitance of the third capacitor C3 in FIG. 5 may be greater than the capacitance of the second capacitor C2.

In one embodiment, the capacitance of the third capacitor C3 may be much greater than the capacitance of the second capacitor C2.

It can be understood that, in the driving circuit 100 in FIG. 5, the control terminal 21 of the second switching unit 2 may be electrically connected to the first node N1, and the first terminal 22 of the second switching unit 2 may be electrically connected to the second voltage signal terminal VAC. The second terminal 23 of the second switching unit 2 may be electrically connected to the first plate of the third capacitor C3, and the second plate of the third capacitor C3 may be electrically connected to the output terminal Po of the driving circuit. At the same time, the first plate of the second capacitor C2 may be electrically connected to the output terminal Po of the driving circuit, and the second plate of the second capacitor C2 may be electrically connected to the common voltage supply terminal COM. When the control terminal 21 of the second switching unit 2 is turned on in response to the voltage of the first node N1, the second voltage signal terminal VAC, the second switching unit 2, the third capacitor C3, the second capacitor C2 and the common voltage supply terminal COM may form a close loop of circuit, and the third capacitor C3 and the second capacitor C2 may divide the voltage. The larger the capacitance, the smaller the voltage division. In another word, the lower the voltage division of the third capacitor C3, the smaller the voltage drop at the second plate of the third capacitor C3, and the smaller the effect of the voltage drop of the third capacitor C3 to the output terminal Po of the driving circuit. Accordingly, the voltage output by the output terminal Po of the driving circuit may be greater, and may be closer to the voltage of the second voltage signal terminal VAC.

In this embodiment, the capacitance of the third capacitor C3 may be greater than the capacitance of the second capacitor C2 such that the divided voltage of the third capacitor C3 may be smaller than the divided voltage of the second capacitor C2. Accordingly, the output voltage of the output terminal Po of the driving circuit may be relatively large.

In embodiment, the capacitance of the third capacitor C3 may be much greater than the capacitance of the second capacitor C2. For example, the capacitance of the third capacitor C3 may be more than ten times of the capacitance of the second capacitor C2. The voltage drop at the second plate may be relatively small such that the voltage output by the output terminal Po of the driving circuit may be close to the voltage of the second voltage signal.

Figure 7:
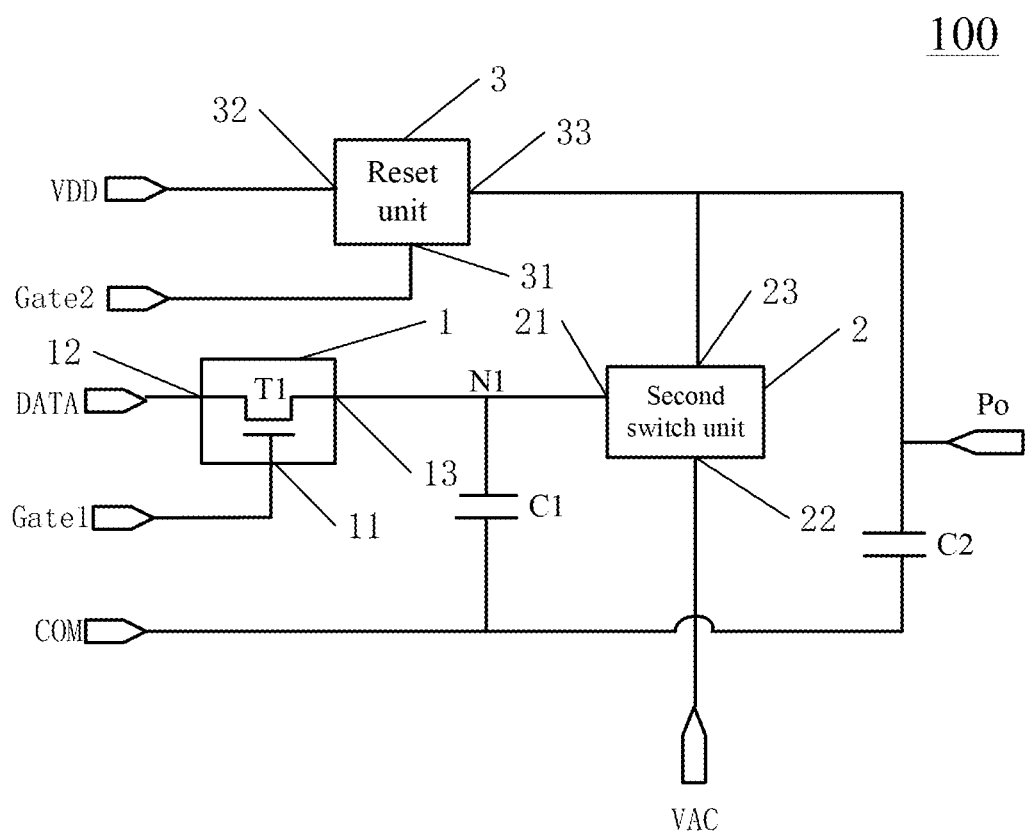
FIG. 7 illustrates another exemplary driving circuit according to various disclosed embodiments of the present disclosure.

FIG. 7 is a schematic structural diagram of another exemplary driving circuit consistent with various disclosed embodiments of the present disclosure. As shown in FIG. 7, the first switching unit 1 may include a first transistor T1. The gate of the first transistor T1 may be electrically connected to the first scan signal terminal Gate1, the source of the first transistor T1 may be electrically connected to the first voltage signal terminal DATA, and the drain of the first transistor T1 may be electrically connected to the first node N1.

FIG. 7 only takes the first transistor T1 as an N-type transistor as an example. At this time, the valid signal of the first scan signal terminal Gate1 may be at a high level, and the first transistor T1 may turned on for a conduction when the first scan signal terminal Gate1 inputs a high level. The first voltage signal of the first voltage signal terminal DATA may be input to the first node N1. In some embodiments, the first transistor T1 may also be a P-type transistor. When the first transistor T1 is a P-type transistor, the valid signal of the first scan signal terminal Gate1 may be at a low level. When the first scan signal terminal Gate1 inputs a low level, the first transistor T1 may be turned on, and the first voltage signal of the first voltage signal terminal DATA may be input to the first node N1.

In one embodiment, the first scan signal terminal Gate1 here may also be multiplexed as the second scan signal terminal Gate2, which is not shown here.

For example, the first transistor T1 may be turned on under the control of the valid signal of the first scan signal terminal Gate1 and may transmit the first voltage signal of the first voltage signal terminal DATA to the first node N1. The control terminal of the second switching unit 21 may be turned on in response to the potential of the first node N1, and the second voltage signal input from the second voltage signal terminal VAC may input to the output terminal Po of the driving circuit. Because the second voltage signal input from the second voltage signal terminal VAC may be an AC signal, the output terminal Po of the driving circuit may output an AC signal. In the prior art, the DC driving is usually adopted, and the DC driving is likely to cause a charge accumulation, and the resistance of the position where the charges are accumulated becomes larger. When applied to the microfluidic technology, it is easy to cause droplets to stay at the position. However, in the present disclosure, because the active AC signal driving may be realized, on the one hand, the number of signal lines may be reduced, and the resistance increase caused by the accumulation of electric charges during the DC driving may be reduced, and the driving ability may be improved.

Figure 8:
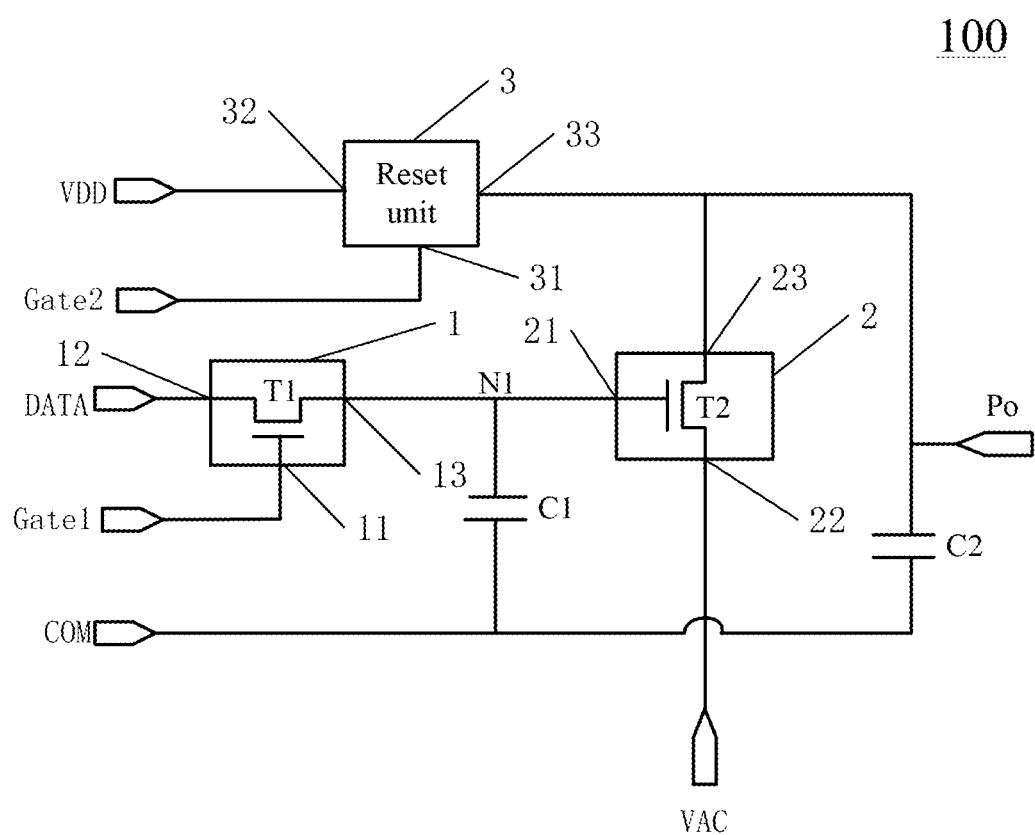
FIG. 8 illustrates another exemplary driving circuit according to various disclosed embodiments of the present disclosure.

FIG. 8 is a schematic structural diagram of another exemplary driving circuit accordingly to various disclosed embodiments of the present disclosure. As shown in FIG. 8, the second switching unit 2 may include a second transistor T2. The gate of the second transistor T2 may be electrically connected to the first node N1, the source of the second transistor T2 may be electrically connected to the second voltage signal terminal VAC, and the drain of the second transistor T2 may be electrically connected to the output terminal Po of the driving circuit.

In one embodiment, the first scan signal terminal Gate1 may also be multiplexed as the second scan signal terminal Gate2, which is not shown here.

In this embodiment, it is also shown that the first switching unit 1 may include a first transistor T1. The gate of the first transistor T1 may be electrically connected to the first scan signal terminal Gate1. The source of the first transistor T1 may be electrically connected to the first voltage signal terminal DATA, and the drain of the first transistor T1 may be electrically connected to the first node N1. The gate of the second transistor T2 may be electrically connected to the first node N1, the source of the second transistor T2 may be electrically connected to the first scan signal terminal Gate1, and the drain of the second transistor T2 may be electrically connected to the output terminal Po of the driving circuit.

FIG. 8 only uses that the first transistor T1 and the second transistor T2 are N-type transistors as an example. At this time, the valid signal of the first scan signal terminal Gate1 may be at a high level. When the first scan signal terminal Gate1 inputs a high level, the first transistor T1 may be turned on, and the first voltage signal of the first voltage signal terminal DATA may be input to the first node N1. The second transistor T2 may have to be turned on. Therefore, the valid signal of the first voltage signal may be at a high level. The valid signal may be input to the first node N1, the second transistor T2 may be turned on, and the second voltage signal of the second voltage signal terminal VAC may be transmitted to the output terminal Po of the driving circuit. Because the second voltage signal input from the second voltage signal terminal VAC may be an AC signal, the output terminal Po of the driving circuit may output an AC signal. In the prior art, the DC driving is usually used, and the DC driving is likely to cause a charge accumulation, and the resistance of the position of the accumulated charges becomes larger. When it is applied to microfluidic control technology, it is easy to cause the droplets to stay at this position. The present disclosure may realize the active AC signal driving. On the one hand, it may reduce the number of signal lines, and may also reduce the resistance increase caused by the accumulation of electric charges during the DC driving. Thus, the driving ability may be improved.

The first transistor T1 and the second transistor T2 may also be P-type transistors. When the first transistor T1 and the second transistor T2 are P-type transistors, the valid signal of the first scan signal terminal Gate1 may be at a low level. When the first second signal terminal Gate1 inputs a low level, the first transistor T1 may be turned on, and the first voltage signal at the first voltage signal terminal DATA may also be at a low level. The first voltage signal may be input to the first node N1, and the second transistor T2 may respond to the first voltage signal (the low level) to be turned on, the second voltage signal of the second voltage signal terminal VAC may be transmitted to the output terminal Po of the driving circuit. Because the second voltage signal input by the second voltage signal terminal VAC may be an AC signal, the output terminal Po of the driving circuit may output an AC signal. In the prior art, the DC driving is usually used, and the DC driving is likely to cause a charge accumulation, and the resistance of the position having the accumulated charges becomes larger. When applied to microfluidic technology, it is easy to cause droplets to stay at the position retention. In the present disclosure, because the active AC signal driving may be realized, the number of signal lines may be reduced, and it may also reduce the resistance increase caused by the accumulation of electric charges during the DC driving. Accordingly, the driving ability may be improved.

Figure 9:
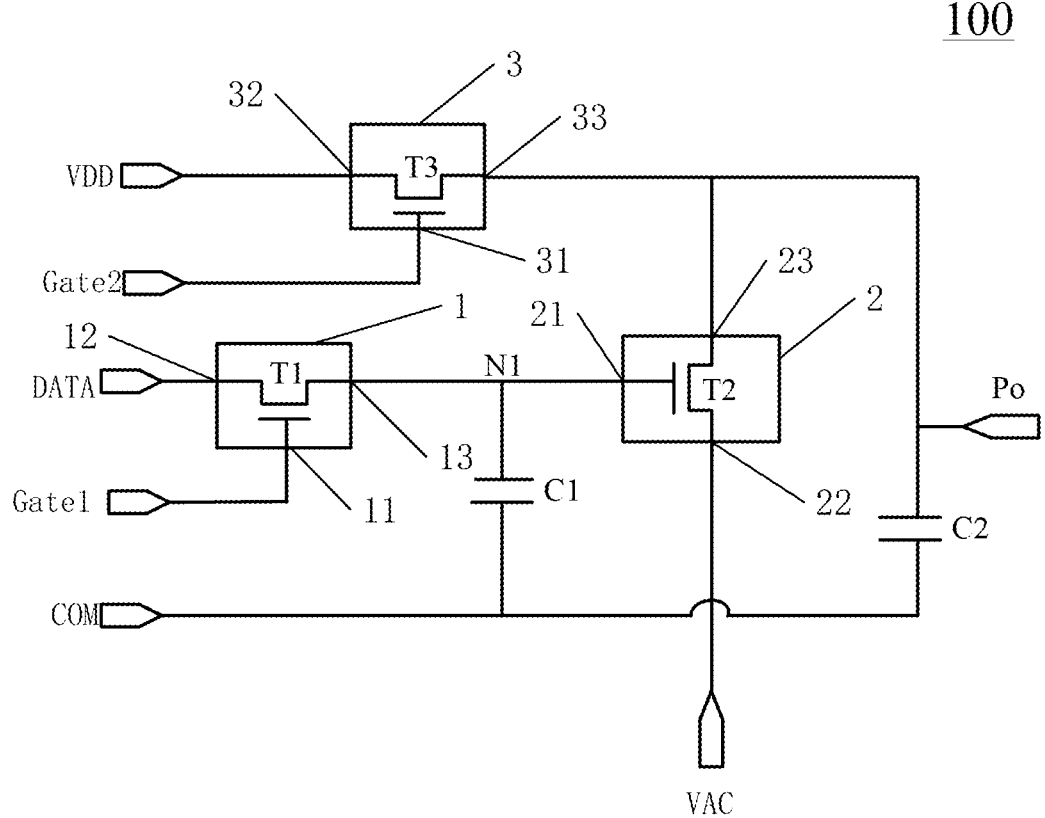
FIG. 9 illustrates another exemplary driving circuit according to various disclosed embodiments of the present disclosure.

FIG. 9 is a schematic structural diagram of another exemplary driving circuit consistent with various disclosed embodiments of the present disclosure. As shown in FIG. 9, in some embodiments, the reset unit 3 in FIG. 9 may include a third transistor T3. The gate of the third transistor T3 may be electrically connected to the second scan signal terminals Gate2, the source of the third transistor T3 may be electrically connected to the third voltage signal terminal VDD, and the drain of the third transistor T3 may be electrically connected to the output terminal Po of the driving circuit.

In one embodiment, the first scan signal terminal Gate1 here may also be multiplexed as the second scan signal terminal Gate2.

FIG. 10 is a schematic structural diagram of another exemplary driving circuit consistent with various disclosed embodiments of the present disclosure. As shown in FIG. 10, in one embodiment, the first switching unit 1 may include a first transistor T1 and a second transistor T2. FIG. 10 only uses the configuration that the first transistor T1, the second transistor T2 and the third transistor T3 are N-type transistors as an example. The first transistor T1 may transmit the first voltage signal (a high level) of the first voltage signal terminal DATA to the first node N1 under the control of the valid signal (a high level) of the first scan signal terminal Gate1, the control terminal of the second transistor T2 may be turned on for a conduction in response to the potential of the first node N1, and the second voltage signal input from the second voltage signal terminal VAC may be input to the output terminal Po of the driving circuit. The second voltage signal may be an AC signal; thus, the output terminal Po of the driving circuit may output an AC signal. When the first voltage signal of the first voltage signal terminal DATA is transmitted to the first node N1, the first capacitor C1 may be charged, and the charges stored in the first capacitor C1 may be able to maintain the AC signal output from the output terminal Po of the driving circuit for a certain period of time. Under the control of the valid signal (a high level) of the second scan signal terminal Gate2, the third transistor T3 may input the third voltage signal of the third voltage signal terminal VDD to the output terminal Po of the driving circuit to reset the output terminal Po of the driving transistor. When the first scan signal is multiplexed as the second scan signal, under the control of the valid signal (high level) of the first scan signal terminal Gate1, the third transistor T3 may input the voltage signal of the third voltage signal terminal VDD to the output terminal Po of the driving circuit. The third voltage signal may be a DC signal. At this time, the second capacitor C2 may be charged. When the output terminal Po of the driving circuit is reset, the second switching unit 2 may not be turned on, the output terminal Po of the driving circuit may be reset to the DC level, and the charges stored in the second capacitor C2 may maintain the output terminal Po of the driving circuit.

In some embodiments, the first transistor T1, the second transistor T2, and the third transistor T3 may also be P-type transistors. When the first transistor T1 and the second transistor T2 are P-type transistors, the first transistor T1 may electrically connected to the first scan signal terminal Gate1. Under the control of the valid signal (a low level), the first voltage signal (a low level) of the first voltage signal terminal DATA may be transmitted to the first node N1, and the control terminal of the second transistor T2 may be turned on in respond to the potential of the first node N1, and the second voltage signal input from the second voltage signal terminal VAC may be input to the output terminal Po of the driving circuit. Because the second voltage signal input from the second voltage signal terminal VAC may be an AC signal, the output terminal Po of the driving circuit may output an AC signal. When the first voltage signal of the first voltage signal terminal DATA is transmitted to the first node N1, the first capacitor C1 may be charged, and the charges stored in the first capacitor C1 may maintain the AC signal output by the output terminal Po of the driving circuit for a certain of time. Under the control of the valid signal (a low level) of the second scan signal terminal Gate2, the third transistor T3 may input the third voltage signal of the third voltage signal terminal VDD to the output terminal Po of the driving circuit to reset the output terminal Po of the driving transistor. When the first scan signal is multiplexed as the second scan signal, under the control of the valid signal (a high level) of the first scan signal terminal Gate1, the third transistor T3 may input the third voltage signal of the third voltage signal terminal VDD to the output terminal Po of the driving circuit. The third voltage signal may be a DC signal. At this time, the second capacitor C2 may be charged. When the output terminal Po of the driving circuit is reset, the second switching unit 2 may not be turned on. The output terminal Po of the driving circuit may be reset to the DC level, and the charges stored in the second capacitor C2 may maintain the output terminal Po of the driving circuit. As a result, the signal output by the output terminal Po of the driving circuit may be switched between an AC signal and a DC signal.

The present disclosure also provides a driving method of the driving circuit. The driving method may be used to drive any one of the driving circuits described in the above embodiments. FIG. 11 is a flowchart of an exemplary driving method consistent with various disclosed embodiments of the present disclosure. As shown in FIG. 11, the driving method may include following steps.

In the first stage t1, the valid signal output by the first scan signal terminal Gate1 may control the first switching unit 1 to be turned on for a conduction. The first voltage signal at the first voltage signal terminal DATA may be transmitted to the first node N1, the first capacitor C1 may be charged, the control terminal 21 of the second switching unit 2 may be turned on in response to the potential of the first node N1, the second voltage signal may be input to the output terminal Po of the driving circuit, and the output terminal Po of the driving circuit may output an AC signal.

In the second stage t2, the signal output from the first scan signal terminal Gate1 may control the first switching unit 1 to be turned off. At the same time, the valid signal output from the second scan signal terminal Gate2 may control the reset unit 3 to be turned on, and the third voltage signal of the third voltage signal terminal VDD may be input to the output terminal Po of the driving circuit, the output terminal Po of the driving circuit may be reset, and the output terminal Po of the driving circuit may output a DC signal.

Referring to FIG. 2, and FIGS. 4-6, no matter in the first stage t1 or the second stage t2, the third voltage signal of the third voltage signal terminal VDD may be a constant voltage, the voltage signal in FIG. 2 may be Vac. The signal of the common voltage supply terminal COM may also be a constant voltage; and the signal of the common voltage supply terminal COM shown in FIG. 2 may be 0V.

In the first stage t1, the valid signal output by the first scan signal terminal Gate1 may control the first switching unit 1 to be turned on, the first voltage signal of the first voltage signal terminal DATA may be transmitted to the first node N1, and the first capacitor C1 may be charged. After charging, the voltage of the first node N1 may be maintained for a certain period of time. To be precise, it may be maintained until the end of the first stage t1. The control terminal 21 of the second switching unit 2 may be turned on in response to the potential of the first node N1. For example, the valid signal of the first voltage signal may ensure that the second switching unit 2 is turned on. After the second switching unit 2 is turned on, the second voltage signal input from the first terminal 22 of the second switching unit 2 may be input to the output terminal Po of the driving circuit. Because the second voltage signal may be an AC signal, the output terminal Po of the driving circuit may output an AC signal at this time. In this stage, the reset unit 3 may not be in operation. For example, the output terminal Po of the driving circuit may not be reset.

In the second stage t2, the signal output by the first scan signal terminal Gate1 controls the first switching unit 1 to be turned off, and the potential of the first node N1 may be used to ensure whether the second switching unit 2 is turned on or not. Because the first switching unit 1 may be turned off, the first voltage signal may not be input to the first node N1, and the second switching unit 2 may not be turned on. In this stage, the valid signal output by the second scan signal terminal Gate2 may control the reset unit 3 to be turned on. The third voltage signal of the third voltage signal terminal VDD may be input to the output terminal Po of the driving circuit, and the output terminal Po of the driving circuit may be reset. Since the third voltage signal may be a constant voltage signal, the output terminal Po of the driving circuit may output a DC signal.

It can be seen that, in the first stage t1, the output of the driving circuit 100 may be an AC signal, and in the second stage t2, the output of the driving circuit 100 may be a DC signal. Thus, the signal output by the output terminal Po of the driving circuit of the present disclosure may be switched between an AC signal and a DC bias voltage. The first switching unit 1 and the first capacitor C1 may keep the second switching unit 2 on or off for one frame of time (t1). When the second switching unit 2 is turned on, the output terminal Po of the driving circuit may directly output an AC signal. When the second switching unit 2 is turned off, the output terminal Po of the driving circuit may be reset to a DC level by the reset unit 3 and may be maintained by the second capacitor C2. Thus, a positive and negative AC signal driving relative to the DC bias may be realized.

In some embodiments, referring to FIGS. 3-4, the first scan signal terminal Gate1 of the driving circuit 100 may be multiplexed as the second scan signal terminal Gate2.

In the second stage t2, the valid signal output by the first scan signal terminal Gate1 may control the reset unit 3 to be turned on.

In the first stage t1, the valid signal output by the first scan signal terminal Gate1 may control the first switching unit 1 to be turned on, the first voltage signal of the first voltage signal terminal DATA may be transmitted to the first node N1, and the first capacitor C1 may be charged. After charging, the voltage of the first node N1 may be maintained for a certain period of time. To be precise, it may be maintained until the end of the first stage t1. The control terminal 21 of the second switching unit 2 may be turned on in response to the potential of the first node N1. For example, a valid signal of the first voltage signal may ensure that the second switching unit 2 is turned on. After the second switching unit 2 is turned on, the second voltage signal input from the first terminal 22 of the second switching unit 2 may be input to the output terminal Po of the driving circuit. Since the second voltage signal may be an AC signal, the output terminal Po of the driving circuit may output an AC signal at this time. In this stage, the reset stage unit 3 may not be in operation, for example, the output terminal Po of the driving circuit may not be reset.

In the second stage t2, the signal output by the first scan signal terminal Gate1 may control the first switching unit 1 to be turned off, and the potential of the first node N1 may be used to ensure whether the second switching unit 2 is turned on. Because the first switching unit 1 may be turned off, the first voltage signal may not be input to the first node N1, and the second switching unit 2 may not be turned on.

In this stage, the first scan signal terminal Gate1 may be multiplexed as the second scan signal terminal Gate2. The valid signal output by the first scan signal terminal Gate1 may control the reset unit 3 to be turned on; and the first scan signal terminal Gate1 may control the first switching unit 1 to be turned on again. Both the reset unit 3 and the first switching unit 1 may be turned on at this time, but the first voltage signal of the first voltage signal terminal DATA may be an invalid signal, and the second switching unit 2 may not be turned on. The third voltage signal of the third voltage signal terminal VDD may be input to the output terminal Po of the driving circuit, and the output terminal Po of the driving circuit may be reset. Because the third voltage signal may be a constant voltage signal, the output terminal Po of the driving circuit may output a DC signal.

This embodiment may ensure that the output terminal Po of the driving circuit may be switched between an AC signal and a DC signal, and at the same time, the number of signal lines of the driving circuit 100 may be reduced, the fabrication process may be simplified, and the production cost may be reduced.

In some embodiments, referring to FIGS. 5 and 6, the driving circuit 100 may further include a third capacitor C3. The first plate of the third capacitor C3 may be electrically connected to the second terminal 23 of the second switching unit 2, and the second plate of the third capacitor C3 may be electrically connected to the output terminal Po of the driving circuit.

The AC signal of the second voltage signal may pass through the third capacitor C3, and the DC signal in the second voltage signal may be filtered out.

It is understandable that the third capacitor C3 may filter out the DC signal in the second voltage signal. In the first stage t1, the signal output by the output terminal Po of the driving circuit may be an AC signal with the DC component filtered out; and the driving ability may be improved.

Referring to FIG. 6 and FIG. 11, the second voltage signal may be an AC signal with an amplitude of 0-2Vac, which may be regarded as a superposition of a DC signal of Vac and an AC signal of Vac. The third capacitor C3 may isolate the DC component. For the AC component, the greater the frequency or the capacitance, the easier the signal may pass. Therefore, after the AC signal with an amplitude of 0-2Vac passes through the third capacitor C3, the output terminal Po of the driving circuit may output an AC signal of Vac.

The first scan signal terminal Gate1 in FIG. 6 may be multiplexed as the second scan signal terminal Gate2. Thus, the number of signal lines may be reduced.

In this embodiment, by providing a third capacitor C3 between the second terminal 23 of the second switching unit 2 and the output terminal Po of the driving circuit, the DC component in the second voltage signal may be filtered in the first stage t1. The signal output by the output terminal Po of the driving circuit may be an AC signal. Accordingly, the driving capability may be improved.

In some embodiments, referring to FIG. 7 and FIG. 2, the first switching unit 1 may include a first transistor T1. The gate of the first transistor T1 may be electrically connected to the first scan signal terminal Gate1, the source of the first transistor T1 may be electrically connected to the first voltage signal terminal DATA, and the drain of the first transistor T1 may be electrically connected to the first node N1.

In the first stage t1, the valid signal output from the first scan signal terminal Gate1 may control the first transistor T1 to be turned on, and in the second stage t2, the signal output from the first scan signal terminal Gate1 may control the first transistor T1 to be turned off.

In the first stage t1, the valid signal output by the first scan signal terminal Gate1 may control the first transistor T1 to be turned on, the first voltage signal of the first voltage signal terminal DATA may be transmitted to the first node N1, and the first capacitor C1 may be charged. After being charged, the voltage of the first node N1 may be maintained for a certain period of time. The control terminal 21 of the second switching unit 2 may be turned on in response to the potential of the first node N1. For example, the valid signal of the first voltage signal may ensure that the second switching unit 2 is turned on. The second voltage signal input from the first terminal 22 of the second switching unit 2 may be input to the output terminal Po of the driving circuit. Because the second voltage signal may be an AC signal, at this time, the output terminal Po of the driving circuit may output an AC signal. In this stage, the reset unit 3 may not be in operation. For example, the output terminal Po of the driving circuit may not be reset.

In the second phase t2, the signal output by the first scan signal terminal Gate1 may control the first transistor T1 to be turned off, and the potential of the first node N1 may ensure that the second switching unit 2 is turned on. Because the first transistor T1 is turned off, the first voltage signal may not be input to the first node N1, and the second switching unit 2 may not be turned on. In this stage, the valid signal output by the second scan signal terminal Gate2 may control the reset unit 3 to be turned on, and the third voltage signal of the third voltage signal terminal VDD may be input to the output terminal Po of the driving circuit, and the output terminal Po of the driving circuit may be reset. Because the third voltage signal may be a constant voltage signal, the output terminal Po of the driving circuit may output a DC signal.

It can be seen that, in the first stage t1, the output of the driving circuit 100 may be an AC signal, and in the second stage t2, the output of the driving circuit 100 may be a DC signal. For example, the signal output by the output terminal Po of the driving circuit of the present disclosure be switched between an AC signal and a DC bias voltage. The first transistor T1 and the first capacitor C1 may keep the second switching unit 2 to be on and off for one frame time. When the second switching unit 2 is turned on, the output terminal Po of the driving circuit may directly output an AC signal. When the second switching unit 2 is turned off, the output terminal Po of the driving circuit may be reset to be a DC level signal by the reset unit 3, and may be maintained by the second capacitor C2. Thus, a positive and negative AC signal driving with a relative DC bias may be realized.

In some embodiments, Referring to FIG. 8 and FIG. 2, the second switching unit 2 may include a second transistor T2. The gate of the second transistor T2 may be electrically connected to the first node N1, the source of the second transistor T2 may be electrically connected to the second voltage signal terminal VAC, and the drain of the second transistor T2 may be electrically connected to the output terminal Po of the driving circuit.

In the first stage t1, the gate of the second transistor T2 may be turned on in response to the potential of the first node N1.

For example, in the first stage t1, the valid signal output by the first scan signal terminal Gate1 may control the first transistor T1 to be turned on, the first voltage signal of the first voltage signal terminal DATA may be transmitted to the first node N1, and the first capacitor C1 may be charged. After charging, the voltage of the first node N1 may be maintained for a certain period of time. The control terminal of the second transistor T2 may be turned on in response to the potential of the first node N1. For example, the valid signal of the first voltage signal may ensure that the second transistor T2 is turned on. When the second transistor T2 is turned on, the second voltage signal input from the source of the second transistor T2 may be input to the output terminal Po of the driving circuit. Because the second voltage signal may be an AC signal, the output terminal Po of the driving circuit may output an AC signal. In this stage, the reset unit 3 may not be in operation. For example, the output terminal Po of the driving circuit may not be reset.

In the second stage t2, the signal output by the first scan signal terminal Gate1 may control the first transistor T1 to be turned off, and the potential of the first node N1 may ensure that the second transistor T2 may be turned on or off. Because the first transistor T1 may be turned off, the first voltage signal may not be input to the first node N1. The second transistor T2 may also not be turned on. In this stage, the valid signal output by the second scan signal terminal Gate2 may controls the reset unit 3 to be turned on, and the third voltage signal of the third voltage signal terminal VDD may be input to the output terminal Po of the driving circuit, and the output terminal Po of the driving circuit may be reset. Since the third voltage signal may be a constant voltage signal, the output terminal Po of the driving circuit may output a DC signal.

It can be seen that the output of the driving circuit 100 in the first stage t1 may be an AC signal, and the output of the driving circuit 100 in the second stage t2 may be a DC signal. The signal output from the output signal terminal Po of the driving circuit in the present disclosure may be switched between an AC sign and a DC bias. The first transistor T1 and the first capacitor C1 may keep the second transistor T2 on or off for a frame time. When the second transistor T2 is turned on, the output terminal Po of the driving circuit may directly output an AC signal. When the second transistor T2 is turned off, the output terminal Po of the driving circuit may reset to a DC level signal by the reset unit 3 and may be maintained by the second capacitor C2. Thus, a positive and negative AC signal driving with a relative DC bias may be realized.

In some embodiments, referring to FIG. 9 and FIG. 2, the reset unit 3 may include a third transistor T3. The gate of the third transistor T3 may be electrically connected to the second scan signal terminal Gate2, and the source of the third transistor T3 may be electrically connected to the third voltage signal terminal VDD, and the drain of the third transistor T3 may be electrically connected to the output terminal Po of the driving circuit.

The valid signal output from the second scan signal terminal Gate2 may control the third transistor T3 to be turned on. For example, in the first stage t1, the valid signal output by the first scan signal terminal Gate1 may control the first transistor T1 to be turned on, the first voltage signal of the first voltage signal terminal DATA may be transmitted to the first node N1, and the first capacitor C1 may be charged. After charging, the voltage of the first node N1 may be maintained for a certain period of time. The control terminal of the second transistor T2 may be turned on in response to the potential of the first node N1. For example, the valid signal of the first voltage signal may ensure that the second transistor T2 is turned on. When the second transistor T2 is turned on, the second voltage signal input from the source of the second transistor T2 may be input to the output terminal Po of the driving circuit. Since the second voltage signal may be an AC signal, the output terminal Po of the driving circuit may output an AC signal. In this stage, the reset unit 3 may not be in operation. For example, the output terminal Po of the driving circuit may not be reset.

In the second stage t2, the signal output by the first scan signal terminal Gate1 may control the first transistor T1 to be turned off, and the potential of the first node N1 may ensure that the second transistor T2 is turned on. Because the first transistor T1 may be turned off, the first voltage signal may not be input to the first node N1, and the second transistor T2 may not be turned on. In this stage, the valid signal output by the second scan signal terminal Gate2 may control the third transistor T3 to be turned on, and the third voltage signal of the third voltage signal terminal VDD may be input to the output terminal Po of the driving circuit, and the output terminal Po of the driving circuit may be reset. Since the third voltage signal may be a constant voltage signal, the output terminal Po of the driving circuit may output a DC signal.

It can be seen that the first transistor T1 and the first capacitor C1 may keep the second transistor T2 on or off for one frame time. When the second transistor T2 is turned on, the output terminal Po of the driving circuit may directly output an AC signal. When the second transistor T2 is turned off, the output terminal Po of the driving circuit may be reset to a DC signal through the third transistor T3, and may be maintained by the second capacitor C2. Thus, the positive and negative AC signal driving relative to the DC bias may be realized. In the first stage, the output of the driving circuit 100 may be an AC signal, and in the second stage t2, the output of the driving circuit 100 may be a DC signal. The signal output by the output terminal Po of the driving circuit of the present disclosure may be switched between an AC signal and a DC bias voltage.

Figure 12:
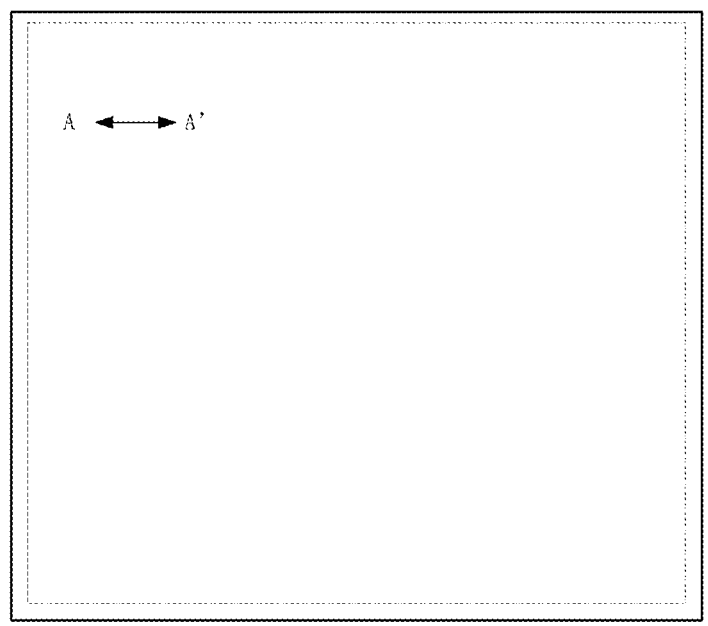
FIG. 12 illustrates a top view of an exemplary microfluidic substrate according to various disclosed embodiments of the present disclosure.
Figure 13:
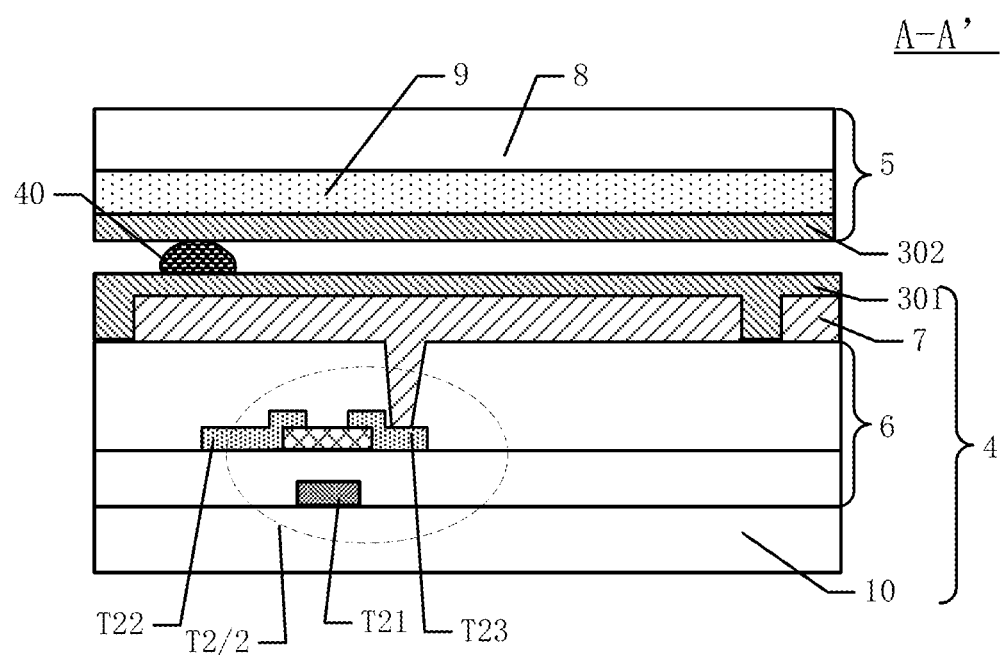
FIG. 13 illustrates an A-A'-sectional view of FIG. 12.

The present disclosure also provides a microfluidic substrate. FIG. 12 is a schematic top view of an exemplary microfluidic substrate according to various disclosed embodiments of the present disclosure. FIG. 13 is an A-A'-sectional view of FIG. 12. As shown in FIGS. 12-13, the microfluidic substrate of may include a first substrate 4 and a second substrate 5 arranged oppositely.

The first substrate 4 may include a first base substrate 10 and an array layer 6 located on the side of the first base substrate 10 adjacent to the second substrate 5. The array layer 6 may include a plurality of driving circuits 100 described in any one of FIGS. 1-10. The first electrode layer (not shown in the figure) located on the side of the array layer 6 away from the first base substrate 10. The first electrode layer may include a plurality of first electrodes 7. The output terminal of the driving circuit (the drain T23 of the second transistor T2 in FIG. 13) may be electrically connected to the first electrode 7 through the via hole.

The second substrate 5 may include a second base substrate 8 and a second electrode 9 located on the side of the second base substrate 8 adjacent to the first substrate 4, and the second electrode 9 may be connected to a constant potential.

In one embodiment, the first base substrate 10 and the second base substrate 8 may be rigid substrates, such as glass substrates, etc.

The electronic components in the driving circuit 100 are not specifically shown in FIG. 13, and only the configuration that the second switching unit 2 may include the second transistor T2 is shown in FIG. 13. The drain T23 of the second transistor T2 be electrically connected to the first electrode 7 through the via hole. The gate T21 of the second transistor T2 and the source T22 of the second transistor T2 are also shown in FIG. 13.

It can be understood that the potential input to the second electrode 9 is a constant potential. For example, the constant potential input to the second electrode 9 may be 0V. In one embodiment, the second electrode 9 may be provided on the entire surface.

When in operation, a microchannel may also be sandwiched between the first substrate 4 and the second substrate 5. The microchannel may have a droplet 40 inside. A first hydrophobic layer 301 may be disposed on a side of the droplet 40 adjacent to the first substrate 4 and a second hydrophobic layer 302 may be disposed on a side of the droplet 40 adjacent to the second substrate 5. For example, the first substrate 4 may include the first hydrophobic layer 301, and the second substrate 5 may include the second hydrophobic layer 302. The first hydrophobic layer 301 and the first hydrophobic layer 301 may be made of a same material. The first electrode 7 may be a driving electrode. The voltage difference between the first electrode 7 and the second electrode 9 may form an electric field, and the droplet 40 may move under the driving action of the electric field. The first electrode 7 and the second electrode 9 may also be arranged in the same layer. For example, the second electrode 9 may also be located on the side of the array layer 6 away from the first base substrate 10, which is not shown in this embodiment.

Because the voltage output by the output terminal Po of the driving circuit in the present disclosure may be switched between an AC signal and a DC signal, when the output terminal Po of the driving circuit outputs an AC signal, the droplet 40 may be driven to move, and the driving capability may be improved. When the droplet 40 moves to the positions of the other adjacent first electrodes 7, the output terminal Po of the driving circuit may output a DC signal, no driving force may be at these positions.

Figure 14:
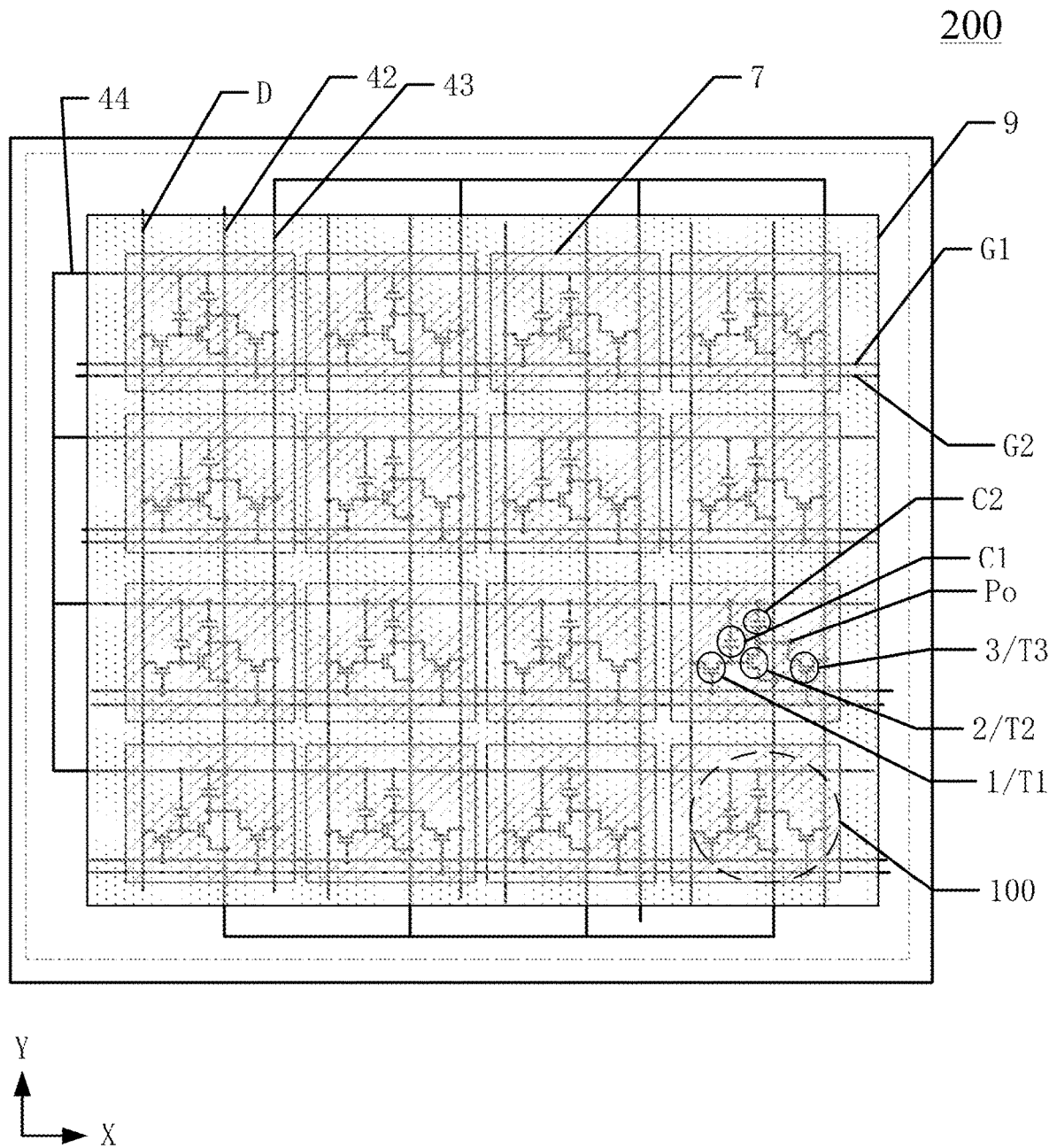
FIG. 14 illustrates a top view of another exemplary microfluidic substrate according to various disclosed embodiments of the present disclosure.

FIG. 14 illustrates a schematic top view of another microfluidic substrate according to various disclosed embodiments of the present disclosure. As show in FIG. 14, in some embodiments, the plurality of first electrodes 7 may be block electrodes arranged in an array. The driving circuit 100 may be electrically connected to at least one first electrode 7.

FIG. 14 illustrates a configuration that a plurality of rectangular block-shaped first electrodes 7 is included a microfluidic substrate. In some embodiments, the shape of the first electrodes 7 may also be a circle, a rounded rectangle, a triangle, or a polygon, etc., which are not specifically limited here. FIG. 14 only illustrates the configuration that the driving circuit 100 is electrically connected to one first electrode 7. In some embodiments, one driving circuit 100 may be electrically connected to multiple first electrodes 7. In this case, the number of driving circuits 100 may be reduced.

In the driving circuit 100 in FIG. 14, the configuration that the first switching unit 1 may include a first transistor T1, the second switching unit 2 may include a second transistor T2, and the third switching unit 3 may include a third transistor T3 is used as an example.

The output terminal of the driving circuit 100 may be electrically connected to the first electrode 7, and the first electrode 7 may be configured as a plurality of block electrodes. Thus, it may be easier to control the droplets 40 in zones and drive the droplets 40 to move.

Figure 15:
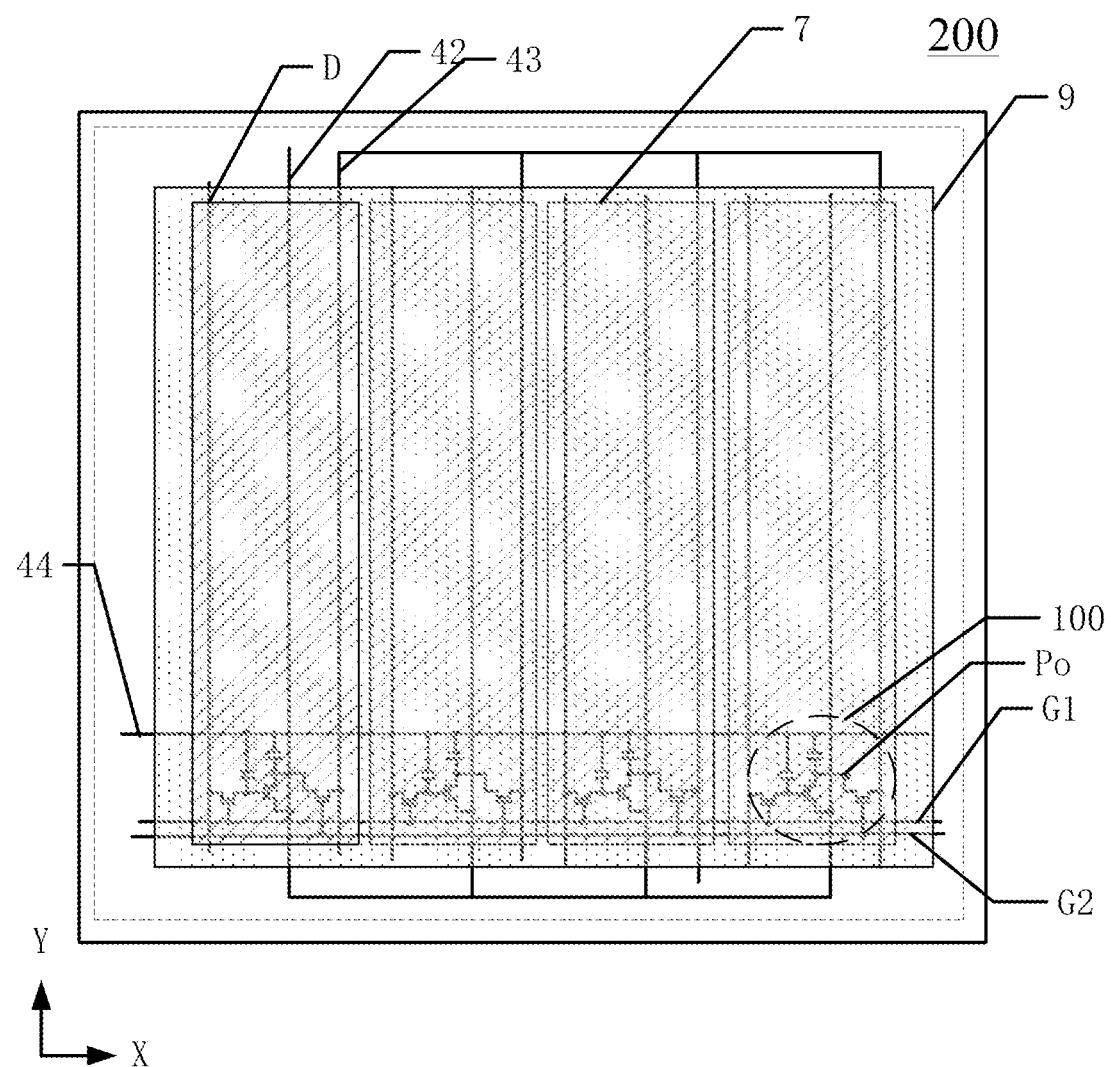
FIG. 15 illustrates a top view of another exemplary microfluidic substrate according to various disclosed embodiments of the present disclosure.

FIG. 15 is a schematic top view of another exemplary microfluidic substrate according to various disclosed embodiments of the present disclosure. As shown in FIG. 7, in some embodiments, the first electrode 7 may be a stripe-shaped electrode. The driving circuit 100 may be electrically connected to one first electrode 7.

FIG. 15 shows a plurality of strip-shaped first electrodes 7 in the microfluidic substrate, and one driving circuit 100 is electrically connected to one first electrode 7. The driving circuit 100 in FIG. 15 may be same as the driving circuit 100 in the embodiment in FIG. 14. In the driving circuit 100 in FIG. 15, the configuration that the first switching unit 1 may include a first transistor T1, the second switching unit 2 may include a second transistor T2, and the third switching unit 3 may include a third transistor T3 is used as an example.

The output terminal Po of the driving circuit may be electrically connected to the first electrode 7. The first electrode 7 may be configured as a plurality of stripe-shaped electrodes. Thus, the number of the first electrodes 7 in the microfluidic substrate may be relatively small, and it may be convenient to manufacture. Further, the droplet 40 may be controlled in different zones; and may be driven to move.

Figure 16:
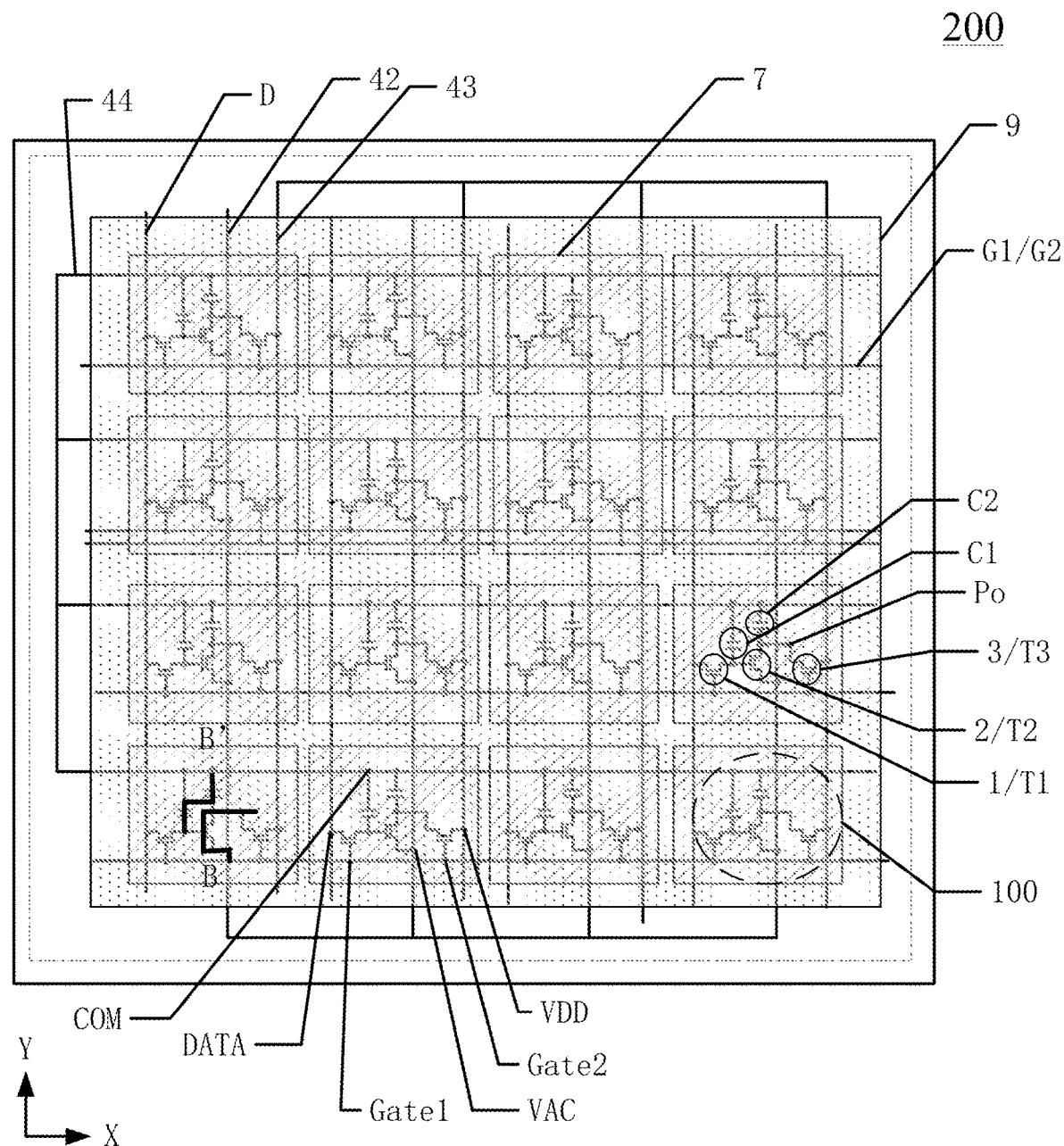
FIG. 16 illustrates a top view of another exemplary microfluidic substrate according to various disclosed embodiments of the present disclosure.
Figure 17:
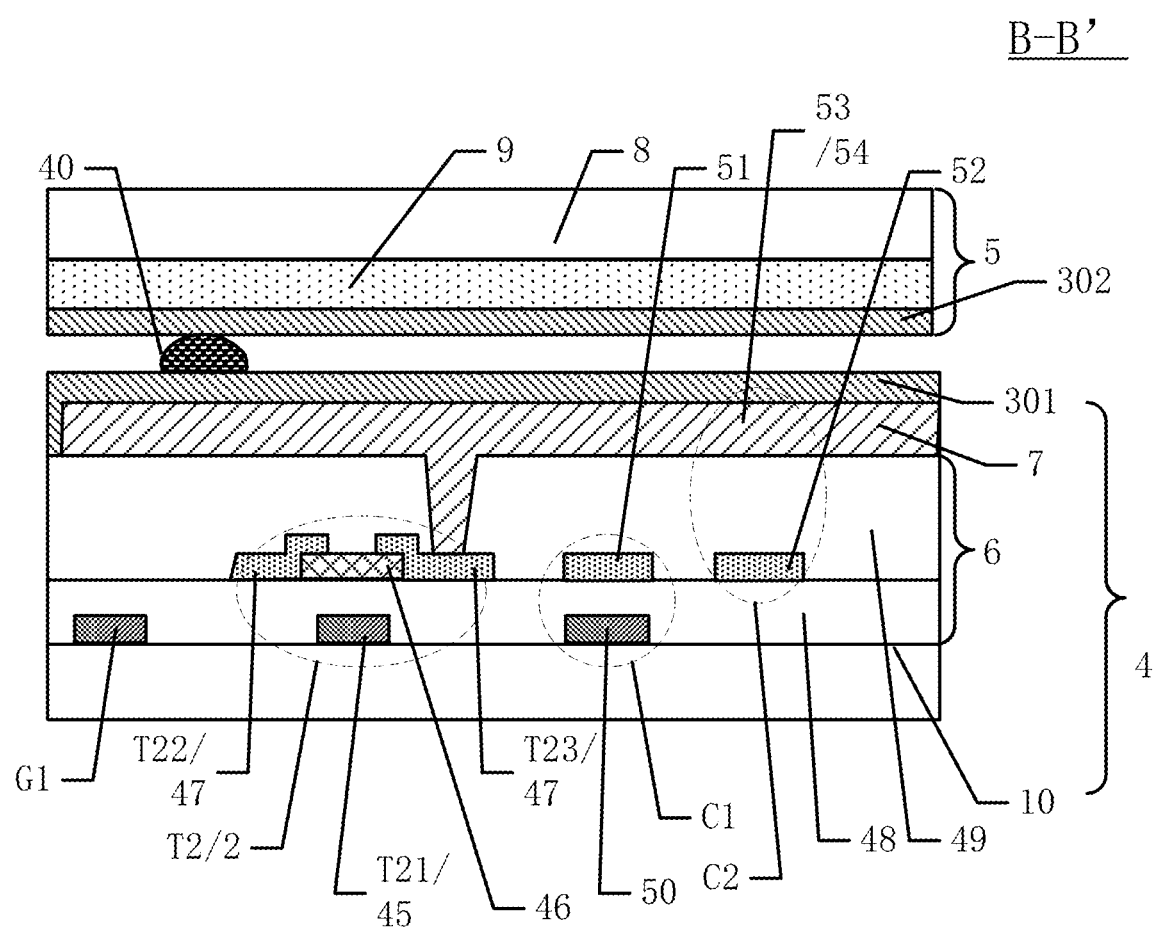
FIG. 17 illustrates a B-B'-sectional view of FIG. 16.

FIG. 16 is a schematic top view of another exemplary microfluidic substrate consistent with various disclosed embodiments of the present disclosure, and FIG. 17 is a B-B'-sectional view of FIG. 16. As shown in FIGS. 16-17, in some embodiments, the first scan signal terminal Gate1 in FIG. 16 may be multiplexed as the second scan signal terminal Gate2. The first switching unit 1 may include a first transistor T1. The gate of the first transistor T1 may be electrically connected to the first scan signal terminal Gate1. The source of the first transistor T1 may be electrically connected to the first voltage signal terminal DATA, and the drain of the first transistor T1 may be electrically connected to the first node N1.

The second switching unit 2 in FIG. 16 may include a second transistor T2. The gate of the second transistor T2 may be electrically connected to the first node N1, the source of the second transistor T2 may be electrically connected to the second voltage signal terminal VAC, and the drain of the second transistor T2 may be electrically connected to the output terminal Po of the driving circuit.

The reset unit 3 in FIG. 16 may include a third transistor T3. The gate of the third transistor T3 may be electrically connected to the second scan signal terminal Gate2, the source of the third transistor T3 may be electrically connected to the third voltage signal terminal VDD, and the drain of the third transistor T3 may be electrically connected to the output terminal Po of the driving circuit.

The microfluidic substrate in FIG. 16 may further include a first scan signal line G1 that extends in a first direction X and is arranged in a second direction Y. The microfluidic substrate may also include a first voltage signal line D, a second voltage signal line 42 and a third voltage signal line 43 that are arranged in the first direction X and extend in the second direction Y. The first scan signal line G1 may include a first scan signal terminal Gate1, the first voltage signal line D may include a first voltage signal terminal DATA, and the second voltage signal line 42 may include a second voltage signal terminal VAC, and the third voltage signal line 43 may include a third voltage signal terminal VDD.

It can be seen from FIG. 16 that the second voltage signal line 42 and the third voltage signal line 43 in all the driving circuits 100 may input a same signal. For example, all the second voltage signal lines 42 may be electrically connected together, and all the third voltage signal lines 43 may be electrically connected together. The common voltage signal line 44 is also shown in FIG. 16. The common voltage signal line 44 may also input one signal. For example, all the common voltage signal lines 44 may be electrically connected together.

Referring to FIG. 17, the array layer 6 may include a first metal layer 45 located on the side of the first base substrate 10 adjacent to the second substrate 5, a semiconductor layer 46 located on the side of the first metal layer 45 away from the first base substrate 10, and a second metal layer 47 located on the side of the semiconductor layer 46 is away from first base substrate 10. The first electrode 7 may be located on the side of the second metal layer 47 away from the first base substrate 10. A first insulating layer 48 may be included between the first metal layer 45 and the semiconductor layer 46, and a second insulating layer 49 may also be included between the second metal layer 47 and the first electrode 7.

The first metal layer 45 may include the gate of the first transistor, the gate of the second transistor T2, the gate of the third transistor T3, and the first scan signal line G1. The second metal layer 47 may include the source and the drain of the first transistor T1, the source and the drain of the second transistor T2, the source and the drain of the third transistor T3, the first voltage signal line, the second voltage signal line, and the third voltage signal line.

The first metal layer 45 may further include a first plate 50 of the first capacitor C1. The second metal layer 47 may further include a second plate 51 of the first capacitor C1 and a first plate 52 of the second capacitor C2.

The microfluidic substrate may further include an auxiliary electrode block 54 that is arranged in the same layer as the first electrode 7. In a direction perpendicular to the plane of the first base substrate 10, the auxiliary electrode block 54 and the first plate 52 of the second capacitor C2 may at least partially overlap to form the second capacitor C2.

The first transistor and the third transistor, the first voltage signal line D, the second voltage signal line, and the third voltage signal line are not shown in the cross-sectional view of FIG. 17.

In some embodiments, the material of the first insulating layer 48 and the second insulating layer 49 may include SiNx, SiOx, or AlOx. Among them, SiNx may reduce the cost due to the easy availability. SiOx and AlOx are high-dielectric materials, which may better insulate the first metal layer 45 from the second metal layer 47, and insulate the second metal layer 47 from the first electrode 7.

In one embodiment, the auxiliary electrode block 54 and the first electrode 7 may be arranged in the same layer, or the first electrode 7 may be made larger. As shown in FIG. 17, the first electrode 7 may be multiplexed as the auxiliary electrode block 54. Thus, it may be unnecessary to provide an extra electrode, and the manufacturing process may be simplified.

The multiplexing of the first scan signal terminal Gate1 as the second scan signal terminal Gate2 in this embodiment may mean that both the first scan signal terminal Gate1 and the second scan signal terminal Gate2 may be connected to the first scan signal line G1. Thus, only one first scan signal line G1 may be sufficient, and no second scan signal line is needed. Accordingly, the number of scan lines in the microfluidic substrate may be reduced.

Figure 18:
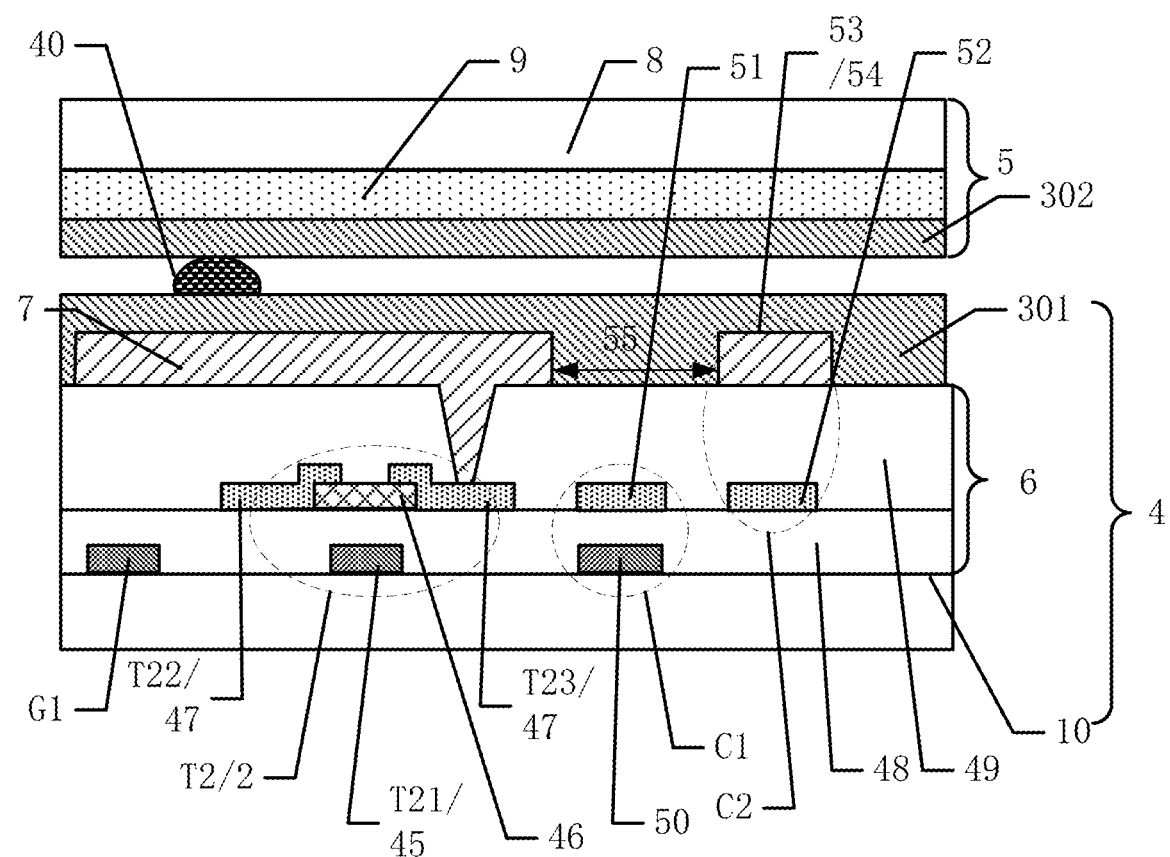
FIG. 18 illustrates another B-B'-sectional view of FIG. 16.

FIG. 18 is another B-B'-sectional view of FIG. 16. As shown in FIG. 18, there may be a first gap 55 between the auxiliary electrode block 54 and the first electrode 7. In the direction perpendicular to the plane where the substrate is located, the first gap 55 and the second plate of the first capacitor C1 may at least partially overlap.

The first transistor T1 and the third transistor T3, the first voltage signal line D, the second voltage signal line 42 and the third voltage signal line 43 are not shown in the cross-sectional view of FIG. 18. The first gap 55 may be made while patterning the first electrode 7, which is not specifically limited here.

It can be understood that, in the direction perpendicular to the plane where the first base substrate 10 is located, a parasitic capacitance may be easily formed between the auxiliary electrode block 54 and the second plate 51 of the first capacitor C1, which is not beneficial to the driving circuit 100. In this embodiment, a first gap 55 may be provided between the auxiliary electrode block 54 and the first electrode 7. The first gap 55 and the second electrode plate 51 of the first capacitor C1 may at least partially overlap. Thus, the parasitic capacitance formed between the first gap 55 and the second electrode plate 51 of the first capacitor C1 and the auxiliary electrode block 54 may be reduced. Accordingly, the driving performance of the driving circuit 100 may be improved.

Further, in this embodiment, in the direction perpendicular to the plane where the first base substrate 10 is located, the distance between the second metal layer 47 and the first electrode 7 may be relatively short, and the first electrode 7 may be multiplexed as the auxiliary electrode block 54 and may be used as the second plate 53 of the second capacitor C2. Thus, the capacitor formed by the auxiliary electrode block 54 and the first electrode plate 52 of the second capacitor C2 may have a larger capacitance, and the area required for the first electrode plate 52 of the second capacitor C2 may be reduced. Accordingly, the area of the first electrode 7 may be reduced, and a larger-scale array design of the first electrodes 7 may be disposed in the microfluidic substrate.

Figure 19:
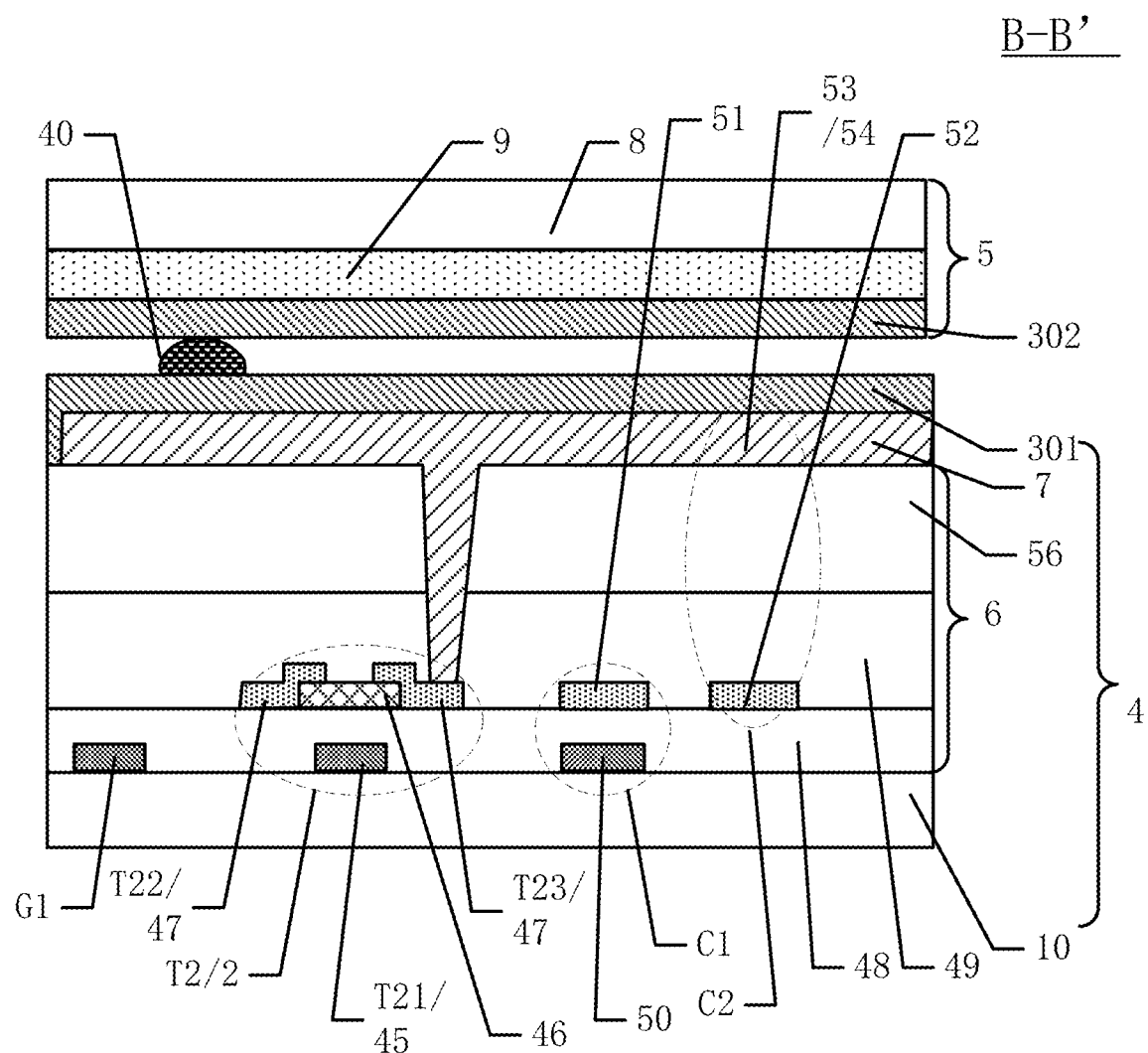
FIG. 19 illustrates another B-B'-sectional view of FIG. 16.

FIG. 19 is another exemplary B-B'-sectional view of FIG. 16. As shown in FIG. 19, in some embodiments, a planarization layer 56 may be disposed between the second insulating layer 49 and the first electrode 7.

Because the second insulating layer 49 on the second metal layer 47 may be generally thin, a planarization layer 56 may be provided on the side of the second insulating layer 49 adjacent to the first electrode 7 for a planarization. Thus, the upper surface of the second insulating layer 49 may be flatter.

In some embodiments, referring to FIG. 1, FIG. 9, and FIGS. 17-19, the second transistor T2 may be an oxide thin-film transistor.

Referring to FIG. 9, it can be seen that the potential holding time of the first node N1 may determine the time of the first stage t1. Thus, it may be necessary to ensure that the leakage current at the first node N1 is substantially small. In one embodiment, the second transistor T2 may be an oxide thin-film transistor. When the first transistor T1 is at the off state, the leakage current may be substantially low to ensure that the potential of the first node N1 may be maintained for a longer period of time. Accordingly the holding time of the first stage t1 may effectively controlled, and the driving capability of the driving circuit may be improved.

It can be seen from the foregoing embodiments that the driving circuit, the driving method, and the microfluidic substrate provided by the present disclosure may at least achieve the following beneficial effects.

The driving circuit of the present disclosure may include a first switching unit. The control terminal of the first switching unit may be electrically connected to the first scan signal terminal. The first terminal of the first switching unit may be electrically connected to the first voltage signal terminal, and the second terminal of the first switching unit may be electrically connected with the first voltage signal terminal. The driving circuit may also include a second switching unit. The control terminal of the second switching unit may be electrically connected to the first node, and the first terminal of the second switch may be electrically connected to the second voltage signal terminal. The second voltage signal input by the second voltage signal terminal may be an AC signal. The second terminal of the second switch may be electrically connected to the output terminal of the driving circuit. Further, the driving circuit may include a reset unit. The control terminal of the reset unit may be electrically connected to the second scan signal terminal, the first terminal of the reset unit may be electrically connected to the third scan signal terminal, the second terminal of the reset unit may be electrically connected to the output terminal of the driving circuit. Further, the driving circuit may include a first capacitor. The first plate of the first capacitor may be electrically connected to the first node, and the second substrate of the first capacitor may be electrically connected to the common voltage supply terminal. Further, the driving circuit may include a second capacitor. The first plate of the second capacitor may be electrically connected with the output terminal of the driving circuit, and the second plate of the second capacitor may be electrically connected with the common voltage supply terminal.

The driving method of the driving circuit may include a first stage and a second stage. In the first stage, the valid signal output by the first scan signal terminal may control the first switching unit to be turned on, and the first voltage signal at the first voltage signal terminal may be transmitted to the first node; and the first capacitor may be charged. The charges stored in the first capacitor may keep the AC signal output by the output terminal of the driving circuit for one frame. The control terminal of the second switching unit may be turned on in response to the potential of the first node, and the second voltage signal may be input to the output terminal of the driving circuit and the output terminal of the driving circuit may output an AC signal. In the second stage, the signal output from the first scan signal terminal may control the first switching unit to be turned off. At the same time, the valid signal output from the second scan signal terminal may control the reset unit to be turned on. The third voltage signal at the third voltage signal terminal may be input to the output terminal of the driving circuit, the output terminal of the driving circuit is reset, the output terminal of the driving circuit may output a DC signal, the second capacitor may be charged, and the charges stored in the second capacitor may be used to maintain the output terminal of the driving circuit. On the one hand, the output terminal of the driving circuit may be switched between a high-frequency AC signal and a DC signal, which may solve the hysteresis residual problem of the microfluidic substrate. On the other hand, the output terminal of the driving circuit may output a high-frequency signal. Thus, the driving performance may be improved.

Although some specific embodiments of the present disclosure have been described in detail through examples, those skilled in the art should understand that the above examples are only for illustration and not for limiting the scope of the present disclosure. Those skilled in the art should understand that the above embodiments can be modified without departing from the scope and spirit of the present disclosure. The scope of the disclosure is defined by the appended claims.

What is claimed is:
1. A driving circuit, comprising:
 a first switching unit, wherein a control terminal of the first switching unit is electrically connected to a first scan signal terminal, a first terminal of the first switch- ing unit is electrically connected to a first voltage signal terminal, and a second terminal of the first switching unit is electrically connected to a first node;

a second switching unit, wherein a control terminal of the second switching unit is electrically connected to the first node, a first terminal of the second switching unit is electrically connected to a second voltage signal terminal, a second voltage signal input into the second voltage signal terminal is an AC signal, and a second terminal of the second switching unit is electrically connected to an output terminal of the driving circuit;

a reset unit, wherein a control terminal of the reset unit is electrically connected to a second scan signal terminal, a first terminal of the reset unit is electrically connected to a third voltage signal terminal, and a second terminal of the reset unit is electrically connected to the output terminal of the driving circuit;

a first capacitor, wherein a first plate of the first capacitor is electrically connected to the first node, and a second plate of the first capacitor is electrically connected to a common voltage supply terminal; and a second capacitor, wherein a first plate of the second capacitor is electrically connected to the output terminal of the driving circuit, and a second plate of the second capacitor is electrically connected to the common voltage supply terminal.

2. The driving circuit according to claim 1, wherein:
the first scan signal terminal is multiplexed as the second scan signal terminal.

3. The driving circuit according to claim 1, further comprising:
a third capacitor, wherein a first plate of the third capacitor is electrically connected to the second terminal of the second switching unit and a second plate of the third capacitor is electrically connected to the output terminal of the driving circuit.

4. The driving circuit according to claim 3, wherein:
a capacitance of the third capacitor is greater than a capacitance of the second capacitor.

5. The driving circuit according to claim 1, wherein the first switching unit comprises:
a first transistor, wherein a gate of the first transistor is electrically connected to the first scan signal terminal; a source of the first transistor is electrically connected to the first voltage signal terminal; and a drain of the first transistor is electrically connected to the first node.

6. The driving circuit according to claim 5, wherein the second switching unit comprises:
a second transistor, wherein a gate of the second transistor is electrically connected to the first node; a source of the second transistor is electrically connected to the second voltage signal terminal; and a drain of the second transistor is electrically connected to the output terminal of the driving circuit.

7. The driving circuit according to claim 6, wherein the reset unit comprises:
a third transistor, wherein a gate of the third transistor is electrically connected to the second scan signal terminal; a source of the third transistor is electrically connected to the third voltage signal terminal; and a drain of the third transistor is electrically connected to the output terminal of the driving circuit.

8. The driving circuit according to claim 7, wherein:
the first transistor, the second transistor and the third transistor are one of an N-type transistor and a P-type transistor.

9. The driving circuit according to claim 1, wherein:
a third voltage signal inputted into the third voltage signal terminal has a constant potential.

10. A driving method of a driving circuit, comprising:
providing the driving circuit, the driving circuit including a first switching unit, wherein a control terminal of the first switching unit is electrically connected to a first scan signal terminal, a first terminal of the first switching unit is electrically connected to a first voltage signal terminal, and a second terminal of the first switching unit is electrically connected to a first node; a second switching unit, wherein a control terminal of the second switching unit is electrically connected to the first node, a first terminal of the second switching unit is electrically connected to a second voltage signal terminal, a second voltage signal input into the second voltage signal terminal is an AC signal, and a second terminal of the second switching unit is electrically connected to an output terminal of the driving circuit; a reset unit, wherein a control terminal of the reset unit is electrically connected to a second scan signal terminal, a first terminal of the reset unit is electrically connected to a third voltage signal terminal, and a second terminal of the reset unit is electrically connected to the output terminal of the driving circuit; a first capacitor, wherein a first plate of the first capacitor is electrically connected to the first node, and a second plate of the first capacitor is electrically connected to a common voltage supply terminal; and a second capacitor, wherein a first plate of the second capacitor is electrically connected to the output terminal of the driving circuit, and a second plate of the second capacitor is electrically connected to the common voltage supply terminal;

in a first stage, controlling the first switching unit to be turned on for conduction by a valid signal outputted from the first scan signal terminal, transmitting a first voltage signal of the first voltage signal terminal to the first node, charging the first capacitor, and turning on the control terminal of the second switching unit for conduction in response to a potential of the first node, inputting a second voltage signal to the output terminal of the driving circuit, and outputting an AC signal by the output terminal of the driving circuit; and in a second stage, controlling the first switching unit to be turned off for disconnection by a signal outputted from the first scan signal terminal, simultaneously controlling the reset unit to be turned on by a valid signal outputted from the second scan signal terminal, inputting a third voltage signal of the third voltage signal terminal to the output terminal of the driving circuit, resetting the output terminal of the driving circuit, and outputting a DC signal by the output terminal of the driving circuit;

wherein:
the first switching unit includes a first transistor, wherein a gate of the first transistor is electrically connected to the first scan signal terminal; a source of the first transistor is electrically connected to the first voltage signal terminal; and a drain of the first transistor is electrically connected to the first node;

in the first stage, a valid signal outputted from the first scan signal terminal controls the first transistor to be turned on; and in the second stage, a signal outputted from the first scan signal terminal controls the first transistor to be turned off;

the second switching unit includes a second transistor, wherein a gate of the second transistor is electrically connected to the first node; a source of the second transistor is electrically connected to the second voltage signal terminal; and a drain of the second transistor is electrically connected to the output terminal of the driving circuit;

in the first stage, a gate of the second transistor is turned on for conduction in response to a potential of the first node;

the reset unit includes a third transistor, wherein a gate of the third transistor is electrically connected to the second scan signal terminal; a source of the third transistor is electrically connected to the third voltage signal terminal; and a drain of the third transistor is electrically connected to the output terminal of the driving circuit; and a valid signal outputted from the second scan signal terminal controls the third transistor to be turned on.

11. The driving method according to claim 10, wherein:

the first scan signal terminal of the driving circuit is multiplexed as the second scan signal terminal; and in the second stage, the valid signal outputted from the first scan signal terminal controls the reset unit to be turned on.

12. The driving method according to claim 10, wherein:

the driving circuit also includes a third capacitor, wherein a first plate of the third capacitor is electrically connected to the second terminal of the second switching unit; and a second plate of the third capacitor is electrically connected to the output terminal of the driving circuit; and an AC signal of the second voltage signal passes through the third transistor and a DC signal in the second voltage signal is filtered out.

13. A microfluidic substrate, comprising:

a first substrate and a second substrate that are opposed to each other, wherein:

the first substrate includes a first base substrate and an array layer, wherein the array layer is located on a side of the first base substrate adjacent to the second substrate;

the array layer includes a plurality of driving circuits, wherein each driving circuit includes:

a first switching unit, wherein a control terminal of the first switching unit is electrically connected to a first scan signal terminal, a first terminal of the first switching unit is electrically connected to a first voltage signal terminal, and a second terminal of the first switching unit is electrically connected to a first node;

a second switching unit, wherein a control terminal of the second switching unit is electrically connected to the first node, a first terminal of the second switching unit is electrically connected to a second voltage signal terminal, a second voltage signal inputted into the second voltage signal terminal is an AC signal, and a second terminal of the second switching unit is electrically connected to an output terminal of the driving circuit;

a reset unit, wherein a control terminal of the reset unit is electrically connected to a second scan signal terminal, a first terminal of the reset unit is electrically connected to a third voltage signal terminal, and a second terminal of the reset unit is electrically connected to the output terminal of the driving circuit;

a first capacitor, wherein a first plate of the first capacitor is electrically connected to the first node, and a second plate of the first capacitor is electrically connected to a common voltage supply terminal; and a second capacitor, wherein a first plate of the second capacitor is electrically connected to the output terminal of the driving circuit, and a second plate of the second capacitor is electrically connected to the common voltage supply terminal;

the first base substrate also includes a first electrode layer located on a side of the array layer away from the first base substrate;

the first electrode layer includes a plurality of first electrodes;

the output terminal of the driving circuit is electrically connected to a first electrode of the plurality of first electrodes through a via;

the second substrate includes a second base substrate and a second electrode, wherein the second electrode is located on a side of the second base substrate adjacent to the first substrate; and the second electrode is connected to a constant potential.

14. The microfluidic substrate according to claim 13, wherein:

the plurality of first electrodes are block electrodes arranged as an array; and one driving circuit is electrically connected to at least one of the plurality of first electrodes.

15. The microfluidic substrate according to claim 13, wherein:

the plurality of first electrodes are stripe-shaped electrodes; and one driving circuit is electrically connected to one of the plurality of first electrodes.

16. The microfluidic substrate according to claim 13, wherein:

the first scan signal terminal is multiplexed as the second scan signal terminal;

the first switching unit includes a first transistor, wherein a gate of the first transistor is electrically connected to the first scan signal terminal; a source of the first transistor is electrically connected to the first voltage signal terminal; and a drain of the first transistor is electrically connected to the first node;

the second switching unit includes a second transistor, wherein a gate of the second transistor is electrically connected to the first node; a source of the second transistor is electrically connected to the second voltage signal terminal; and a drain of the second transistor is electrically connected to the output terminal of the driving circuit;

the reset unit includes a third transistor, wherein a gate of the third transistor is electrically connected to the second scan signal terminal; a source of the third transistor is electrically connected to the third voltage signal terminal; and a drain of the third transistor is electrically connected to the output terminal of the driving circuit;

the microfluidic substrate further includes first scan signal lines extending in a first direction and arranged in a second direction, and a first voltage signal line, a second voltage signal line and a third voltage signal line arranged in the first direction and extending in the second direction;

the first scan signal line includes the first scan signal terminal;

the first voltage signal line includes the first voltage signal terminal;

the second voltage signal line includes the second voltage signal terminal;

the third voltage signal line includes the third voltage signal terminal;

the array layer includes a first metal layer located on a side of the first base substrate adjacent to the second substrate, a semiconductor layer located on a side of the first metal layer away from the first base substrate, and a second metal layer located on a side of the semiconductor layer away from the first base substrate;

the first electrode is located on a side of the second metal layer away from the first base substrate;

a first insulating layer is included between the semiconductor layer and the first metal layer; a second insulating layer is also included between the second metal layer and the first electrode;

the first metal layer includes the gate of the first transistor, the gate of the second transistor, the gate of the third transistor, the first scan signal line and the second scan signal line;

the second metal layer includes the source and the drain of the first transistor, the source and the drain of the second transistor, the source and the drain of the third transistor, the first voltage signal line, the second voltage signal line and the third voltage signal line;

the first metal layer further includes a first plate of the first capacitor, and the second metal layer further includes a second plate of the first capacitor and a first plate of the second capacitor;

the microfluidic substrate further includes an auxiliary electrode block;

the auxiliary electrode block and the first electrode are arranged in a same layer; and in a direction perpendicular to a plane where the first base substrate is located, the auxiliary electrode block and the first plate of the second capacitor at least partially overlap to form the second capacitor.

17. The microfluidic substrate according to claim 16, wherein:

a first gap is formed between the auxiliary electrode block and the first electrode; and in the direction perpendicular to the plane where the first base substrate is located, the first gap and the second plate of the first capacitor at least partially overlap.

18. The microfluidic substrate according to claim 16, wherein:

a planarization layer is also disposed between the second insulating layer and the first electrode.

19. The microfluidic substrate according to claim 16, wherein:

the first insulating layer and the second insulating layer are made of one of $SiN_x$, $SiO_x$ and $AlO_x$.

20. The microfluidic substrate according to claim 16, wherein:

the second transistor is an oxide thin-film transistor.

* * * * *